United States Patent
Cha et al.

(10) Patent No.: US 11,214,164 B2
(45) Date of Patent: Jan. 4, 2022

(54) METHOD AND APPARATUS FOR CONTROLLING WIRELESS POWER TRANSFER TO ELECTRIC VEHICLE USING BRIDGELESS RECTIFIER

(71) Applicants: Hyundai Motor Company, Seoul (KR); Kia Motors Corporation, Seoul (KR); Research & Business Foundation Sungkyunkwan University, Gyeonggi-do (KR)

(72) Inventors: Jae Eun Cha, Gyeonggi-do (KR); Woo Young Lee, Gyeonggi-do (KR); Gyu Yeong Choe, Gyeonggi-do (KR); Byoung Kuk Lee, Gyeonggi-do (KR); Jong Eun Byun, Gyeonggi-do (KR); Sang Joon Ann, Gyeonggi-do (KR); Won Jin Son, Gyeonggi-do (KR); Jae Han Lee, Gyeonggi-do (KR)

(73) Assignees: Hyundai Motor Company, Seoul (KR); Kia Motors Corporation, Seoul (KR); Research & Business Foundation Sungkyunkwan University, Gyeonggi-do (KR)

( * ) Notice: Subject to any disclaimer, the term of this patent is extended or adjusted under 35 U.S.C. 154(b) by 286 days.

(21) Appl. No.: 16/426,832

(22) Filed: May 30, 2019

(65) Prior Publication Data
US 2019/0366866 A1 Dec. 5, 2019

(30) Foreign Application Priority Data

Jun. 1, 2008 (KR) .................. 10-2018-0063498
May 10, 2019 (KR) .................. 10-2019-0054749

(51) Int. Cl.
*B60L 53/62* (2019.01)
*H02J 7/02* (2016.01)
(Continued)

(52) U.S. Cl.
CPC ............... *B60L 53/62* (2019.02); *B60L 53/12* (2019.02); *H02J 7/025* (2013.01); *H02J 50/12* (2016.02);
(Continued)

(58) Field of Classification Search
CPC .... B60L 53/62; B60L 53/12; B60L 2240/547; H02J 50/90; H02J 50/12; H02J 7/025;
(Continued)

(56) References Cited

U.S. PATENT DOCUMENTS

| 9,985,481 B2* | 5/2018 | Elad ..................... H02J 50/80 |
| 2015/0364947 A1* | 12/2015 | Murayama ............. H02M 1/32 320/108 |

(Continued)

*Primary Examiner* — Suresh Memula
(74) *Attorney, Agent, or Firm* — Mintz Levin Cohn Ferris Glovsky and Popeo, P.C.; Peter F. Corless

(57) ABSTRACT

A method for controlling wireless power transfer to an EV using a bridgeless rectifier may include detecting a phase difference between an input voltage of a transmission-side resonance circuit and an output voltage of a reception-side resonance circuit; after detecting the phase difference, predicting a resonance frequency change direction according to a preconfigured design condition; and controlling switching time points of switches included in the bridgeless rectifier in a direction compensating for the predicted change direction.

20 Claims, 15 Drawing Sheets

(51) Int. Cl.
    *H02J 50/12*    (2016.01)
    *H02M 3/335*    (2006.01)
    *H02M 7/217*    (2006.01)
    *B60L 53/12*    (2019.01)
    *H02J 50/90*    (2016.01)
    *B60K 6/28*     (2007.10)

(52) U.S. Cl.
    CPC ......... *H02J 50/90* (2016.02); *H02M 3/33576* (2013.01); *H02M 7/217* (2013.01); *B60K 6/28* (2013.01); *B60L 2240/547* (2013.01); *B60Y 2200/91* (2013.01); *B60Y 2200/92* (2013.01); *B60Y 2300/91* (2013.01)

(58) Field of Classification Search
    CPC .... H02M 3/33576; H02M 7/217; B60K 6/28; B60Y 2200/91; B60Y 2200/92; B60Y 2300/91
    USPC ....................................................... 320/108
    See application file for complete search history.

(56) References Cited

U.S. PATENT DOCUMENTS

| | | | |
|---|---|---|---|
| 2017/0222488 A1* | 8/2017 | Madawala | H01F 38/14 |
| 2018/0053598 A1* | 2/2018 | Long | H01F 38/14 |
| 2018/0226842 A1* | 8/2018 | Uchida | H02J 50/40 |
| 2019/0013691 A1* | 1/2019 | Oshima | H02J 7/0029 |
| 2019/0165611 A1* | 5/2019 | Miyazawa | H02M 1/32 |
| 2020/0328620 A1* | 10/2020 | Alarcon Cot | H02M 3/1582 |

\* cited by examiner

WHEN $Z_{o,ac}$ IS CONTROLLED TO BE INDUCTIVE

---- : $V_{in}$ ——— : $V_{o,ac}$ —·— : $V_{o,ac1}$ —··— : $I_{o,ac} \doteq I_{o,ac1}$ WHEN $Z_{o,ac}$ IS CONTROLLED TO BE CAPACITIVE ---- : $V_{in}$ ——— : $V_{o,ac}$ —·— : $V_{o,ac1}$ —··— : $I_{o,ac} \doteq I_{o,ac1}$

REFERENCE [ β=30°, γ=90° ]

——— : $V_{o,ac}$  — — : $V_{o,ac1}$  —·— : $I_{o,ac}$

WHEN ONLY DUTY IS CONTROLLED
[ β=90°, γ=90° ]

——— : $V_{o,ac}$  — — : $V_{o,ac1}$  —·— : $I_{o,ac}$

WHEN ONLY SWITCHING TIME IS CONTROLLED
[ β=30°, γ =40° ]

—— : $V_{o,ac}$   —·— : $V_{o,ac1}$   —··— : $I_{o,ac}$

WHEN BOTH SWITCHING TIME AND DUTY ARE CONTROLLED
[ β=30°, γ =40° ]

—— : $V_{o,ac}$   —·— : $V_{o,ac1}$   —··— : $I_{o,ac}$

MINIMUM k, $V_{batt}$=240V [β CONTROL]
[DESIGN POINT]

----- : $V_{in}$ ——— : $I_{in}$*10 —·— : $I_{o,ac}$*10 —··— : $V_{o,ac}$

MINIMUM k, $V_{batt}$=410V [β CONTROL]
[DESIGN POINT]

----- : $V_{in}$ ——— : $I_{in}$*10 —·— : $I_{o,ac}$*10 —··— : $V_{o,ac}$

MAXIMUM k, $V_{batt}$=330V [ONLY β IS CONTROLLED]

----- : $V_{in}$ ——— : $I_{in}$*10 —·— : $I_{o,ac}$*10 ---- : $V_{o,ac}$

MAXIMUM k, $V_{batt}$=410V [β AND γ ARE CONTROLLED]

----- : $V_{in}$ ——— : $I_{in}$*10 —·— : $I_{o,ac}$*10 ---- : $V_{o,ac}$

MAXIMUM k, $V_{batt}$=240V [β CONTROL]
[DESIGN POINT]

----- : $V_{in}$ ——— : $I_{in}$*10 —·— : $I_{o,ac}$*10 ---- : $V_{o,ac}$

MAXIMUM k, $V_{batt}$=410V [β CONTROL]
[DESIGN POINT]

----- : $V_{in}$ ——— : $I_{in}$*10 —·— : $I_{o,ac}$*10 ---- : $V_{o,ac}$

MINIMUM k, $V_{batt}$=330V [ONLY β IS CONTROLLED]

----- : $V_{in}$ ——— : $I_{in}$*10 —·— : $I_{o,ac}$*10 ---- : $V_{o,ac}$

MINIMUM k, $V_{batt}$=330V [β AND γ ARE CONTROLLED]]

----- : $V_{in}$ ——— : $I_{in}$*10 —·— : $I_{o,ac}$*10 ---- : $V_{o,ac}$

MINIMUM k, $V_{batt}$=330V [ONLY β IS CONTROLLED]

----- : $V_{in}$ ——— : $I_{in}$*10 —·— : $I_{o,ac}$*10 —··— : $V_{o,ac}$

MINIMUM k, $V_{batt}$=330V [β AND γ ARE CONTROLLED]

----- : $V_{in}$ ——— : $I_{in}$*10 —·— : $I_{o,ac}$*10 —··— : $V_{o,ac}$

MAXIMUM k, $V_{batt}$=330V [ONLY β IS CONTROLLED]

---- : $V_{in}$ —— : $I_{in}$*10 —·— : $I_{o,ac}$*10 —··— : $V_{o,ac}$

MAXIMUM k, $V_{batt}$=330V [β AND γ ARE CONTROLLED]

---- : $V_{in}$ —— : $I_{in}$*10 —·— : $I_{o,ac}$*10 —··— : $V_{o,ac}$

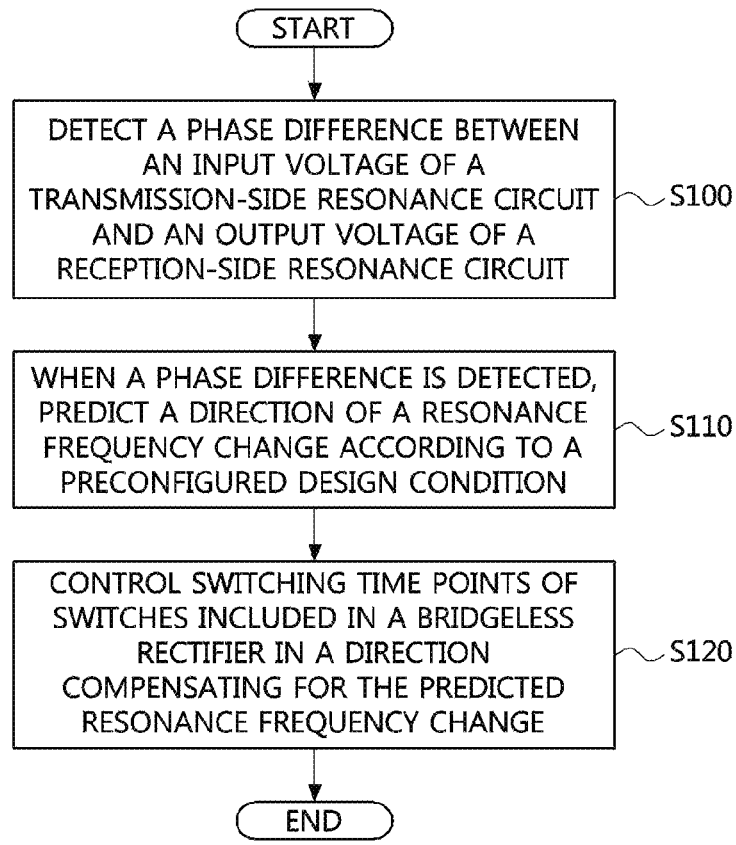
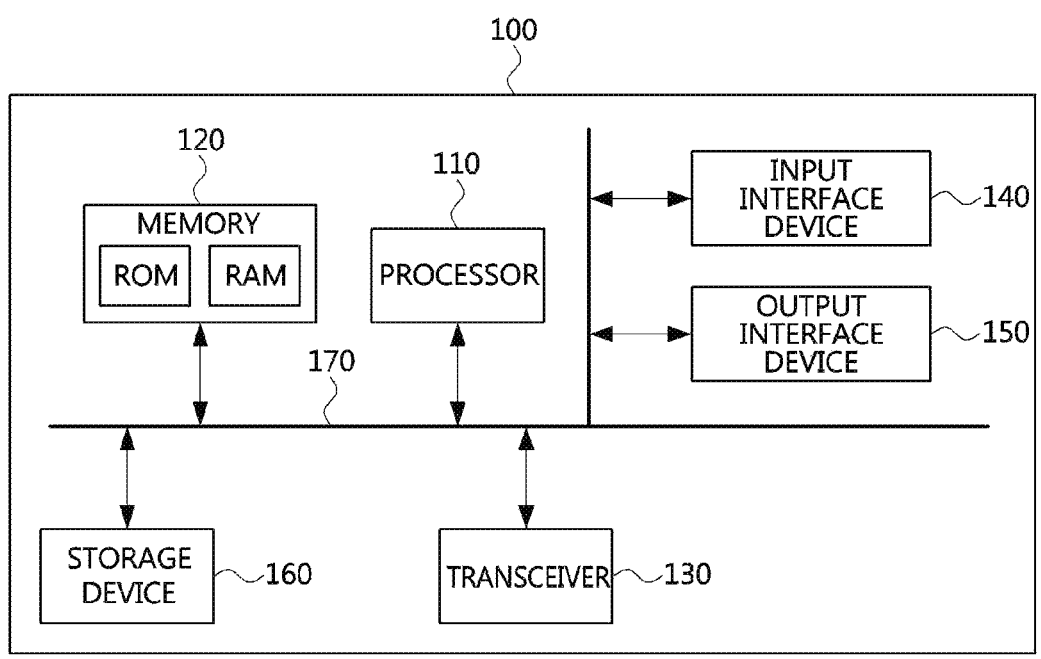

METHOD AND APPARATUS FOR CONTROLLING WIRELESS POWER TRANSFER TO ELECTRIC VEHICLE USING BRIDGELESS RECTIFIER

CROSS-REFERENCES TO RELATED APPLICATIONS

The present application claims the benefit of priority to Korean Patent Application No. 10-2018-0063498, filed on Jun. 1, 2018 in the Korean Intellectual Property Office (KIPO), and Korean Patent Application No. 10-2019-0054749, filed on May 10, 2019 in the KIPO, the entire contents of which are incorporated herein by reference.

TECHNICAL FIELD

The present disclosure relates to a method and an apparatus for controlling wireless power transfer to an electric vehicle, and more specifically, to a method and an apparatus for compensating for resonance frequency fluctuations occurring in an alignment process for electric vehicle charging by controlling a switching duty and a switching time point of a bridgeless rectifier.

BACKGROUND

An electric vehicle (EV) charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type").

When charging an EV wirelessly, a reception coil in a vehicle assembly (VA) mounted in the EV forms an inductive resonant coupling with a transmission coil in a group assembly (GA) located in a charging station or a charging spot. Electric power is then transferred from the GA to the VA to charge the high-voltage battery of the EV through the inductive resonant coupling.

Meanwhile, in a WPT system for transferring wireless power to an EV, physical positions of a transmission pad and a reception pad may change depending on a position where the EV is parked. Also, a coupling coefficient and inductances may change due to the positional variation between the transmission pad and the reception pad.

Since a transmission-side (or, primary-side) resonance frequency and/or a reception-side (or, secondary-side) resonance frequency may change as the inductances change, power transfer may be ineffective when the WPT system is operated at the transmission-side resonance frequency. On the other hand, when the WPT system is operated at the reception-side resonance frequency, a phase difference between an input voltage and a current at the transmission-side increases, and thus a problem of increasing a rated output (VA unit) may occur.

SUMMARY

Embodiments of the present disclosure provide a method for controlling wireless power transfer to an electric vehicle using a bridgeless rectifier. Also, embodiments of the present disclosure provide an apparatus for controlling wireless power transfer to an electric vehicle using a bridgeless rectifier. Also, embodiments of the present disclosure provide an electric vehicle for controlling wireless power transfer to the electric vehicle using a bridgeless rectifier.

According to embodiments of the present disclosure, a method for controlling wireless power transfer to an EV using a bridgeless rectifier may include detecting a phase difference between an input voltage of a transmission-side resonance circuit and an output voltage of a reception-side resonance circuit; after detecting the phase difference, predicting a resonance frequency change direction according to a preconfigured design condition; and controlling switching time points of switches included in the bridgeless rectifier in a direction compensating for the predicted change direction.

The bridgeless rectifier may include a first rectifier circuit in which a first diode and a first switch are connected in series and a second rectifier circuit in which a second diode and a second switch are connected in series, and the first rectifier circuit and the second rectifier circuit may be connected in parallel with each other.

The transmission-side resonance circuit and the reception-side resonance circuit may be configured to satisfy a target resonance frequency set in accordance with one of a minimum value, a maximum value and a median value of a coupling coefficient derived within an allowable separation range between a transmission pad and a reception pad.

The output voltage of the reception-side resonance circuit may be applied to the bridgeless rectifier as a voltage difference between a node located between the first diode and the first switch and a node located between the second diode and the second switch.

The controlling of the switching time points of the switches may include time points at which the first switch and the second switch operate may be controlled.

When the transmission-side resonance circuit and the reception-side resonance circuit are configured to satisfy the target resonance frequency set in accordance with the minimum value of the coupling coefficient, the switching time points of the switches may be changed in a direction in which a phase of the output voltage of the reception-side resonance circuit decreases by 90° after a positive half-period or a negative half-period of the output voltage starts.

When the transmission-side resonance circuit and the reception-side resonance circuit are configured to satisfy the target resonance frequency set in accordance with the maximum value of the coupling coefficient, the switching time points of the switches may be changed in a direction in which a phase of the output voltage of the reception-side resonance circuit increases by 90° after a positive half-period or a negative half-period of the output voltage starts.

The switches may be controlled so that a point of 90° after a positive half-period or a negative half-period of the output voltage starts becomes a center point at which the switches operate.

The method may further comprise detecting a voltage and a current of an EV battery to which an output current of the bridgeless rectifier is transferred; and controlling a switching duty of the switches when the detected voltage or current does not satisfy a predetermined requirement.

Furthermore, according to embodiments of the present disclosure, an apparatus for controlling wireless power transfer to an EV using a bridgeless rectifier may include a processor and a memory storing instructions executable by the processor. When the instructions are executed, the processor may be configured to detect a phase difference between an input voltage of a transmission-side resonance circuit and an output voltage of a reception-side resonance circuit; after detecting the phase difference, predict a resonance frequency change direction according to a preconfigured design condition; and control switching time points of switches included in the bridgeless rectifier in a direction compensating for the predicted change direction.

The bridgeless rectifier may include a first rectifier circuit in which a first diode and a first switch are connected in series and a second rectifier circuit in which a second diode and a second switch are connected in series, and the first rectifier circuit and the second rectifier circuit may be connected in parallel with each other.

The transmission-side resonance circuit and the reception-side resonance circuit may be configured to satisfy a target resonance frequency set in accordance with one of a minimum value, a maximum value and a median value of a coupling coefficient derived within an allowable separation range between a transmission pad and a reception pad.

The output voltage of the reception-side resonance circuit may be applied to the bridgeless rectifier as a voltage difference between a node located between the first diode and the first switch and a node located between the second diode and the second switch.

The controlling of the switching time points of the switches may include contorlling time points at which the first switch and the second switch operate.

When the transmission-side resonance circuit and the reception-side resonance circuit are configured to satisfy the target resonance frequency set in accordance with the minimum value of the coupling coefficient, the switching time points of the switches may be changed in a direction in which a phase of the output voltage of the reception-side resonance circuit decreases by 90° after a positive half-period or a negative half-period of the output voltage starts.

When the transmission-side resonance circuit and the reception-side resonance circuit are configured to satisfy the target resonance frequency set in accordance with the maximum value of the coupling coefficient, the switching time points of the switches may be changed in a direction in which a phase of the output voltage of the reception-side resonance circuit increases by 90° after a positive half-period or a negative half-period of the output voltage starts.

The switches may be controlled so that a point of 90° after a positive half-period or a negative half-period of the output voltage starts becomes a center point at which the switches operate.

The processor may be further configured to detect a voltage and a current of an EV battery to which an output current of the bridgeless rectifier is transferred; and control a switching duty of the switches when the detected voltage or current does not satisfy a predetermined requirement.

Furthermore, according to embodiments of the present disclosure, an EV for controlling wireless power transfer to the EV using a bridgeless rectifier may include a processor; a memory storing instructions executable by the processor; a reception-side resonance circuit coupled with a transmission coil and configured to receive wireless power from the transmission coil; a bridgeless rectifier configured to rectify an output current of the reception-side resonance circuit and to output the rectified current; and a battery configured to receive and store the output of the bridgeless rectifier and to supply energy to the EV. When the instructions are executed, the processor may be configured to detect a phase difference between an input voltage of a transmission-side resonance circuit and an output voltage of a reception-side resonance circuit; after detecting the phase difference, predict a resonance frequency change direction according to a preconfigured design condition; and control switching time points of switches included in the bridgeless rectifier in a direction compensating for the predicted change direction.

The bridgeless rectifier may include a first rectifier circuit in which a first diode and a first switch are connected in series and a second rectifier circuit in which a second diode and a second switch are connected in series, and the first rectifier circuit and the second rectifier circuit may be connected in parallel with each other.

According to the embodiments of the present disclosure, the charging efficiency can be improved by compensating for the variation of the alignment state and the resonance frequency occurring in the EV charging process. In particular, since the bridgeless rectifier is controlled so that the transmission-side resonance frequency and the reception-side resonance frequency coincide with each other, the WPT can be performed with high efficiency.

Also, when the design point is set as the maximum coupling coefficient or the minimum coupling coefficient, the bridgeless rectifier can be controlled in a unidirectional manner, thereby reducing a control difficulty. Moreover, when the design point is set as the medium coupling coefficient, the bridgeless rectifier can be controlled in both directions, whereby the resonance frequency variation can be compensated even when the resonance frequency variation is large.

BRIEF DESCRIPTION OF DRAWINGS

Embodiments of the present disclosure will become more apparent by describing in detail embodiments of the present disclosure with reference to the accompanying drawings, in which:

FIG. 13 is a flowchart illustrating a method for controlling WPT to an EV using a bridgeless rectifier according to embodiments of the present disclosure; and FIG. 14 is a block diagram illustrating an apparatus for controlling WPT to an EV using a bridgeless rectifier according to embodiments of the present disclosure.

Figure 1:
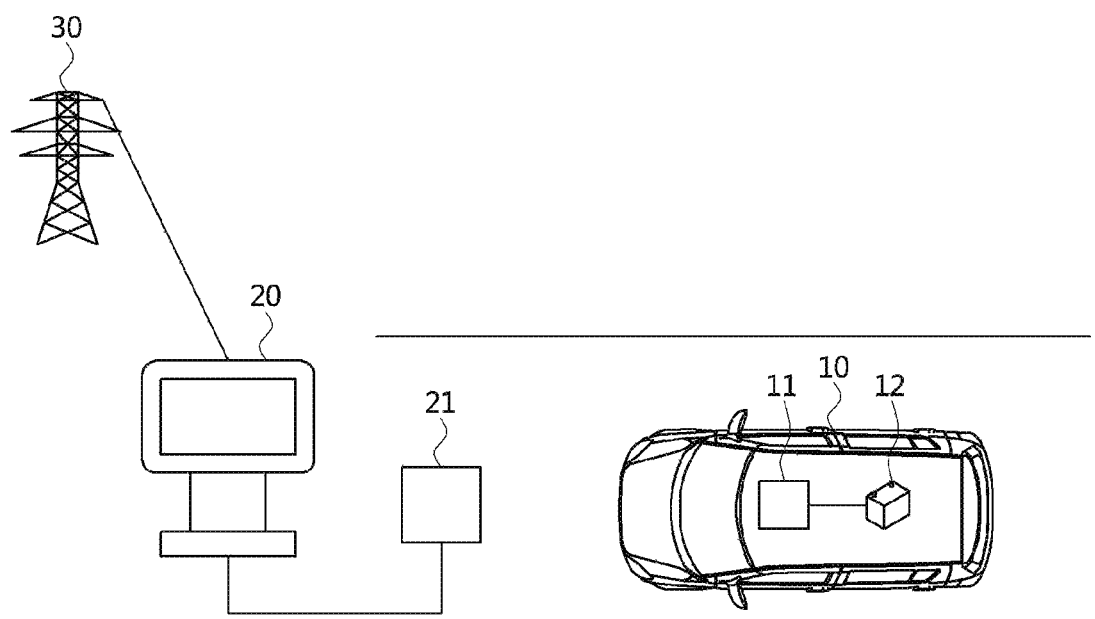
FIG. 1 is a conceptual diagram illustrating a concept of a wireless power transfer (WPT) to which embodiments of the present disclosure are applied.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

According to embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets or roads.

The EV may include an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H. D. Vehicle)": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system.

Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device (PD)": An apparatus which provides the contactless coupling to the secondary device. That is, the primary device may be an apparatus external to an EV. When the EV is receiving power, the primary device may act as the source of the power to be transferred.

The primary device may include the housing and all covers.

"Secondary device (SD)": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishment of a relationship between two peer communication entities.

"Command and control communication": The communication between the EV supply equipment and the EV exchanges information necessary to start, control and terminate the process of WPT.

"High-level communication (HLC)": HLC is a special kind of digital communication. HLC is necessary for additional services which are not covered by command & control communication. The data link of the HLC may use a power line communication (PLC), but it is not limited.

"Low-power excitation (LPE)": LPE means a technique of activating the primary device for the fine positioning and pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

According to embodiments of the present disclosure, "rapid charging" may refer to a method of directly converting AC power of a power system to DC power, and supplying the converted DC power to a battery mounted on an EV. Here, a voltage of the DC power may be DC 500 volts (V) or less.

According to embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. Here, the EV may further include an on-board charger (OBC) which is a device configured for boosting the AC power for the slow charging, converting the AC power to DC power, and supplying the converted DC power to the battery.

According to embodiments of the present disclosure, a frequency tuning may be used for performance optimization. Here, the frequency tuning may be performed by a supply device and may not be performed by an EV device. Also, it may be required for all the primary devices to provide the frequency tuning over a full range. In addition, an electric vehicle power controller (EVPC) may operate in a frequency range between 81.38 kHz and 90.00 kHz. A nominal frequency (hereinafter, referred to as a target frequency, a design frequency, or a resonance frequency) for the magnetic field wireless power transfer (MF-WPT) may be 85 kHz. The power supply circuits may provide the frequency tuning.

Hereinafter, embodiments of the present disclosure will be explained in detail by referring to accompanying figures.

FIG. 1 is a conceptual diagram illustrating a concept of a wireless power transfer (WPT) to which embodiments of the present disclosure are applied.

As shown in FIG. 1, a WPT may be performed by at least one component of an electric vehicle (EV) 10 and a charging station 20, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to embodiments of the present disclosure may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

Here, the charging station 20 may be connected to a power grid 30 or a power backbone, and may provide an alternating current (AC) power or a direct current (DC) power to a power transmission pad 21 including a transmission coil through a power link.

Also, the charging station 20 may communicate with an infrastructure management system or an infrastructure server that manages the power grid 30 or a power network through wired/wireless communications, and performs wireless communications with the EV 10. Here, the wireless communications may be Bluetooth, ZigBee, cellular, wireless local area network (WLAN), or the like.

Also, for example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad or the power reception pad may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

In the present disclosure, the transmission pad 21 or the reception pad 11 may collectively be referred to as a "wireless charging pad".

Figure 2:
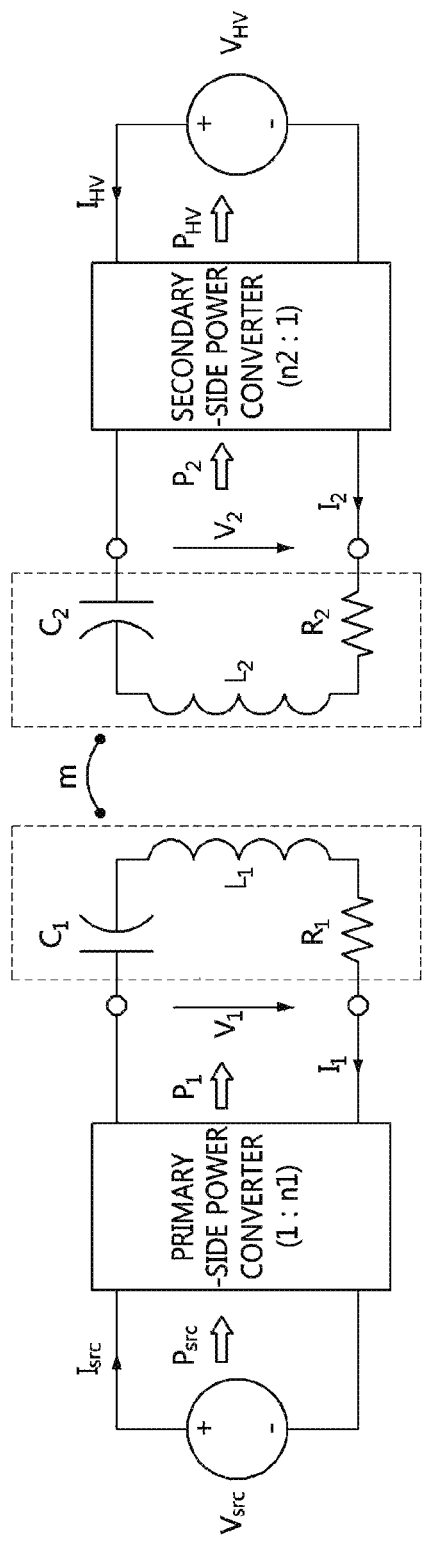
FIG. 2 is a conceptual diagram illustrating a WPT circuit according to embodiments of the present disclosure.

FIG. 2 is a conceptual diagram illustrating a WPT circuit according to embodiments of the present disclosure.

As shown in FIG. 2, a schematic configuration of a circuit in which a WPT is performed in an EV WPT system may be seen.

Here, the left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left-side circuit of FIG. 2 may provide an output power $P_{src}$ corresponding to the power source $V_{src}$ supplied from the power network to a primary-side power converter. The primary-side power converter may supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter for converting the power $P_{src}$ which is an AC power supplied from the power network into a DC power, and a low frequency (LF) converter for converting the DC power into an AC power having an operating frequency suitable for wireless charging. For example, the operating frequency for wireless charging may be determined to be within 80 to 90 kHz.

The power $P_1$ output from the primary-side power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$. Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to a secondary-side power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The secondary-side power converter may include an LF-to-DC converter that converts the supplied power $P_2$ of a specific operating frequency to a DC power having a voltage level suitable for the battery $V_{HV}$ of the EV.

The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil Lt.

The circuit of FIG. 2 should be understood as an illustrative circuit for WPT in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

The transmission coil $L_1$ may be included in the transmission pad 21 in FIG. 1, and the reception coil $L_2$ may be included in the reception pad 11 in FIG. 1. Also, the transmission coil may be referred to also as a GA coil, and the reception coil may be referred to also as a VA coil.

Therefore, positioning between the transmission pad and the reception pad or positioning between the EV and the transmission pad will be described below with reference to the drawings.

Figure 3:
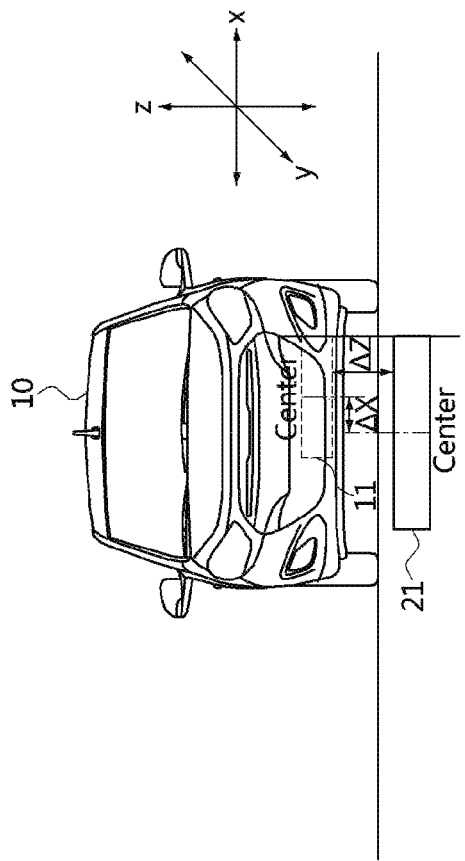
FIG. 3 is a conceptual diagram for explaining a concept of alignment in an EV WPT according to embodiments of the present disclosure.

FIG. 3 is a conceptual diagram for explaining a concept of alignment in an EV WPT according to embodiments of the present disclosure.

As shown in FIG. 3, a method of aligning the power transmission pad 21 and the power reception pad 11 in the EV in FIG. 1 will be described. Here, positional alignment may correspond to the alignment, which is the above-mentioned term, and thus may be defined as positional alignment between the GA and the VA, but is not limited to the alignment of the transmission pad and the reception pad.

Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories according to its heights (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

The height of the reception pad measured from the ground surface may correspond to the previously defined term "vehicle magnetic ground clearance."

Further, the position of the power transmission pad 21 in the height direction (i.e., defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within ±75 mm in the horizontal direction (defined in the x-direction), and within ±100 mm in the vertical direction (defined in the y-direction).

Here, the relative positions of the power transmission pad 21 and the power reception pad 11 may be varied in accordance with their experimental results, and the numerical values should be understood as exemplary.

Although the alignment between the pads is described on the assumption that each of the transmission pad 21 and the reception pad 11 includes a coil, more specifically, the alignment between the pads may mean the alignment between the transmission coil (or GA coil) and the reception coil (or VA coil) which are respectively included in the transmission pad 21 and the reception pad 11.

Figure 4:
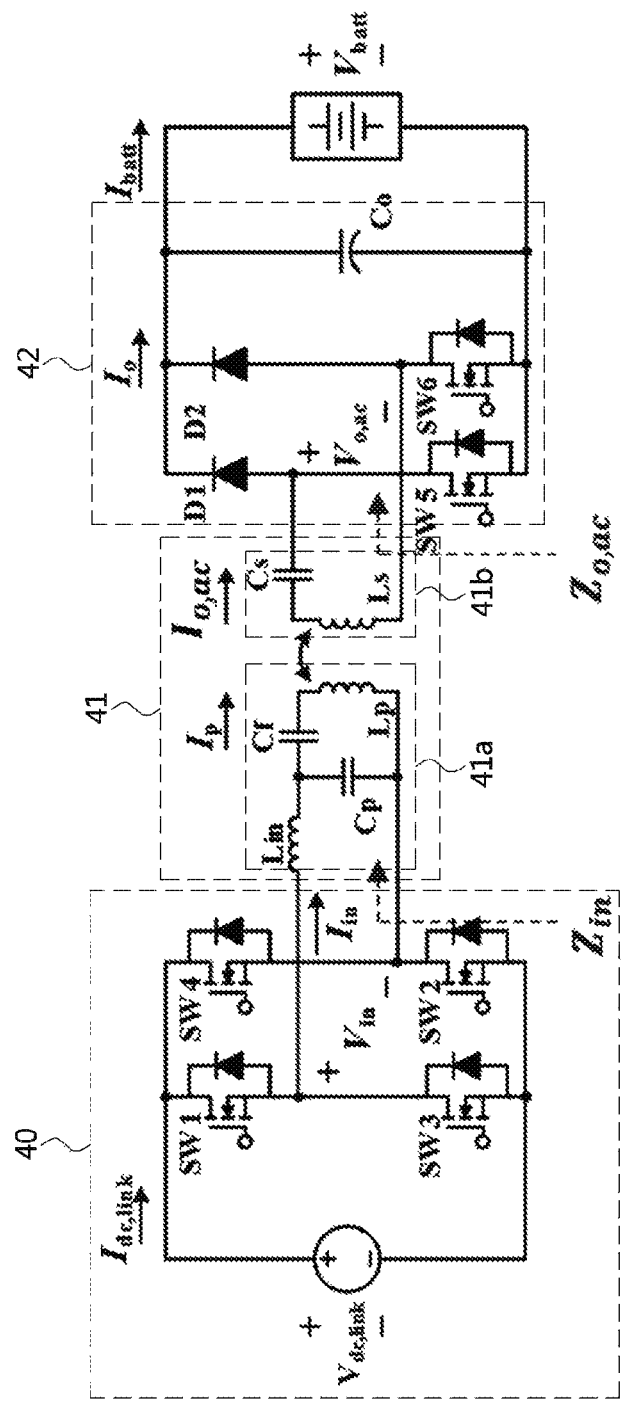
FIG. 4 is a circuit diagram illustrating a WPT system according to embodiments of the present disclosure.

FIG. 4 is a circuit diagram illustrating a WPT system according to embodiments of the present disclosure.

As shown in FIG. 4, a WPT system according to an embodiment of the present disclosure includes a full bridge inverter 40 that receives a DC power $V_{dc,link}$ and outputs an AC voltage $V_{in}$, a compensation circuit 41 that receives the AC voltage from the full bridge inverter 40 and generates an induced electromotive force in a reception coil built in a reception pad of an EV, a bridgeless rectifier 42 that outputs a current $I_o$ by rectifying an induced current $I_{o,ac}$ according to the induced electromotive force and stores the current $I_o$ in a capacitor $C_o$, and an EV battery $V_{batt}$ that receives an energy stored in the capacitor $C_o$ of the bridgeless rectifier 42. Here, a DC-to-DC converter for converting a voltage according to the capacitor of the bridgeless rectifier to a voltage according to the EV battery may be connected in parallel with the EV battery.

Here, the full bridge inverter 40 may include a first series circuit and a second series circuit connected in parallel with the DC power supply $V_{dc,link}$. Here, the first series circuit may be a circuit in which a first switch SW1 and a third switch SW3 are connected in series. The second series circuit may be a circuit in which a fourth switch SW4 and a second switch SW2 are connected in series. Also, the full bridge inverter 40 may supply a voltage difference $V_{in}$ between a node $V_{in+}$ between the first switch SW1 and the third switch SW3 and a node $V_{in-}$ between the fourth switch SW4 and the second switch SW2 as an input voltage $V_{in}$ (or, referred to also as a "transmission-side input voltage") of the compensation circuit 41. Here, MOSFET switches may be used as the switches used in the full bridge inverter 40. Further, each switch may be connected in parallel with a diode.

Here, the compensation circuit 41 may be connected to the input voltage $V_{in}$ delivered by the full bridge inverter 40, and may include a transmission-side resonance circuit 41a of LCCL type in which two inductors $L_{in}$ and $L_p$ and two capacitors $C_f$ and $C_p$ are connected in series and in parallel with each other (here, the inductor and the capacitor are connected in series) and a reception-side resonance circuit 41b which outputs an induced current $I_{o,ac}$ generated in a reception-side by an electromotive force induced from the transmission-side resonance circuit.

Here, the LCCL type transmission-side resonance circuit 41a may include an input inductor $L_{in}$ and a first capacitor $C_p$ connected in series to the input voltage, and may further include a circuit connected in parallel with the first capacitor $C_p$, in which a second capacitor $C_f$ and a transmission coil $L_p$ are connected in series.

In the reception-side resonance circuit 41b, a reception coil $L_s$ magnetically coupled to the transmission coil $L_p$ (here, mutual inductance thereof is defined as M), where an electromotive force is induced, and a reception capacitor $C_s$ may be connected in series.

Here, the bridgeless rectifier 42 may include a first rectifier circuit in which a first diode D1 and a fifth switch SW5 are connected in series and a second rectifier circuit in which a second diode D2 and a sixth switch SW6 are connected in series, and the first rectifier circuit and the second rectifier circuit may be connected in parallel with each other. Also, the induced current $I_{o,ac}$ of the compensation circuit 41 (or, a current induced in the reception-side resonance circuit) may be input through a node $V_{o,ac+}$ between the first diode D1 and fifth switch SW5 and/or a node $V_{o,ac-}$ between the second diode D2 and the sixth switch SW6. Also, a voltage difference $V_{o,ac}$ between the node $V_{o,ac+}$ between the first diode D1 and fifth switch SW5 and/or the node $V_{o,ac-}$ between the second diode D2 and the sixth switch SW6 may be applied as an input voltage to the bridgeless rectifier 42. In this case, the voltage difference $V_{o,ac}$ between the node $V_{o,ac+}$ between the first diode D1 and fifth switch SW5 and/or the node $V_{o,ac-}$ between the second diode D2 and the sixth switch SW6 may be referred to as an output voltage of the reception-side resonance circuit 41b or a reception-side output voltage.

Here, the bridgeless rectifier 42 may store a current $I_o$ rectified from the first rectifier circuit and/or the second rectifier circuit in a capacitor $C_o$ connected in parallel with the first rectifier circuit and the second rectifier circuit.

On the other hand, the circuits of the WPT system are not necessarily limited to the configuration according to FIG. 4. For example, the resonance circuits of the compensation circuit 41 may be implemented in parallel, or other inverters such as a half bridge inverter may be used instead of the full bridge inverter.

In addition, the WPT system according to FIG. 4 illustrates the transmission-side (or, primary side) of the WPT system and the reception-side (or, secondary side) of the WPT system together in terms of a simple circuit diagram. For the purpose of simplicity, the transmission-side of the WPT system and the reception-side of the WPT system may be referred to herein as "transmission-side" and "reception-side," respectively. The full bridge inverter 40 and the transmission-side resonance circuit 41a may be included in the charging station 20 and/or the transmission pad 21 according to FIG. 1, and the reception-side resonance circuit 41b and the bridgeless rectifier 42 may be included in the EV 10 and/or the reception pad 11 of the EV 10 according to FIG. 1.

Figure 5:
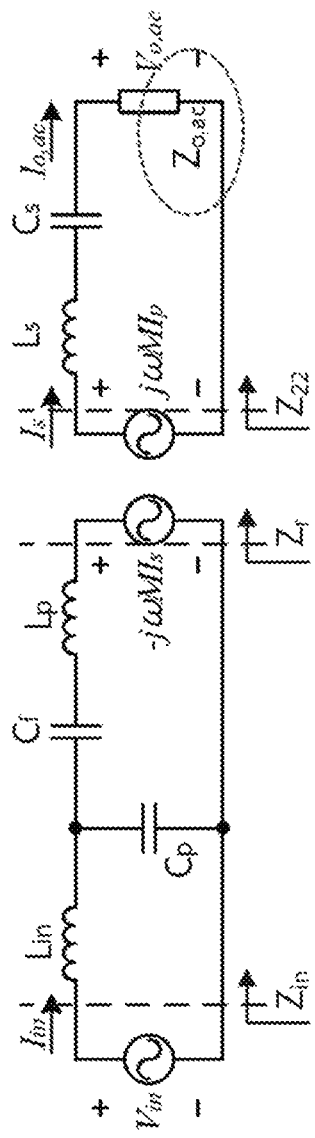
FIG. 5 is an equivalent circuit diagram of a WPT system implementing a bridgeless rectifier in a reception-side of the WPT system according to FIG. 4.

FIG. 5 is an equivalent circuit diagram of a WPT system implementing a bridgeless rectifier in a reception-side according to FIG. 4.

In the WPT system according to FIG. 4, the front end of the compensation circuit, which includes the full bridge inverter, may be substituted with an equivalent voltage $V_{in}$ and an equivalent current $I_{in}$, and the rear end of the compensation circuit, which includes the bridgeless rectifier and the EV battery, may be substituted with a reception-side equivalent output impedance $Z_{o,ac}$, so that an equivalent circuit diagram according to FIG. 5 may be derived. In FIG. 5, a component $-jwMI_s$ and a component $jwMI_p$ may represent a mutual inductance M according to FIG. 4 in frequency domain (or, Fourier domain). Also, a voltage applied to the reception-side equivalent output impedance may be referred to as a reception-side equivalent output voltage $V_{o,ac}$ which has the same meaning as the reception-side output voltage according to FIG. 4.

In FIG. 5, the reception-side equivalent output impedance $Z_{o,ac}$ for the rear end of the compensation circuit may be defined as shown in Equation 1 below.

$$Z_{o,ac} = \frac{V_{o,ac1}}{I_{o,ac1}} = R + jX \qquad \text{[Equation 1]}$$

In FIG. 5, a reception-side equivalent impedance $Z_{22}$ may be calculated as shown in Equation 2 below.

$$Z_{22} = j\omega L_s + \frac{1}{j\omega C_s} + R + jX \qquad \text{[Equation 2]}$$

Referring to Equation 2, since the reception-side equivalent impedance $Z_{22}$ includes the reception-side equivalent output impedance $Z_{o,ac}$ according to Equation 1, the reception-side equivalent impedance $Z_{22}$ may be changed when the reception-side equivalent output impedance $Z_{o,ac}$ changes.

In FIG. 5, the reception-side equivalent impedance $Z_r$ projected (or, reflected) to the transmission-side may be calculated as shown in Equation 3 below.

$$Z_r = \frac{\omega^2 M^2}{Z_{22}} = \frac{\omega^2 M^2}{j\omega L_s + \frac{1}{j\omega C_s} + R + jX} \qquad \text{[Equation 3]}$$

Referring to Equation 3, since the reception-side equivalent impedance $Z_r$ projected to the transmission-side (or, referred to as a reflected impedance) also includes the equivalent output impedance $Z_{o,ac}$ in its denominator, the reception-side equivalent impedance $Z_r$ reflected to the transmission-side may be changed when the reception-side equivalent output impedance $Z_{o,ac}$ changes.

In FIG. 5, the transmission-side equivalent impedance $Z_{in}$ may be as shown in Equation 4 below.

$$Z_{in} = j\omega L_{in} + \frac{1}{\frac{1}{j\omega C_p} + \frac{1}{\frac{1}{j\omega C_f} + j\omega L_p + Z_r}} \qquad \text{[Equation 4]}$$

Referring to Equation 4, since the transmission-side equivalent impedance $Z_{in}$ includes the reflected impedance $Z_r$ according to Equation 3 and the reflected impedance $Z_r$ is affected by variations of the reception-side equivalent output impedances $Z_{o,ac}$, the transmission-side equivalent impedance $Z_{in}$ may also be changed in accordance with the reception-side equivalent output impedance $Z_{o,ac}$.

That is, by integrating Equations 1 to 4, when the reception-side equivalent output impedance $Z_{o,ac}$ is controlled, not only the reception-side equivalent impedance but also the transmission-side equivalent impedance (or, reflected impedance) may be changed. Thus, both a transmission-side resonance frequency and a reception-side resonance frequency can be controlled.

Further, the reception-side equivalent output impedance $Z_{o,ac}$ can be controlled by controlling a switching time point and a duty of the bridgeless rectifier of FIG. 4. Therefore, using the bridgeless rectifier in the reception-side of the EV WPT system and controlling the switching time point and duty of the bridgeless rectifier, the variation of the transmission-side resonance frequency and the reception-side resonance frequency (i.e., variation due to a positional change of the transmission and reception pads) can be compensated.

Figure 6A:
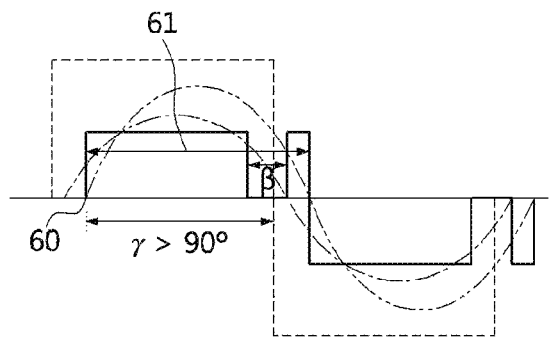
FIGS. 6A and 6B are diagrams explaining a method of controlling an equivalent output impedance by controlling a switching time point and a duty of a bridgeless rectifier.
Figure 6B:
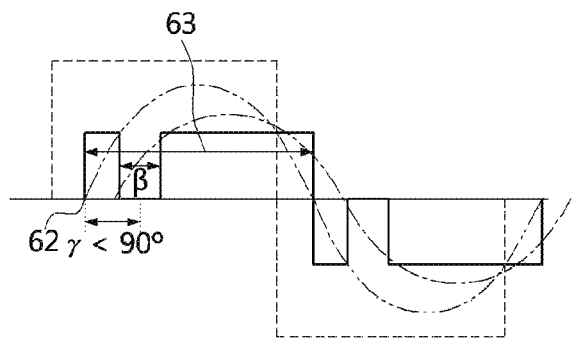

FIGS. 6A and 6B are diagrams explaining a method of controlling an equivalent output impedance by controlling a switching time point and a duty of a bridgeless rectifier.

Referring to a graph of FIG. 6A, a case where the reception-side equivalent output impedance $Z_{o,ac}$ is controlled inductively may be identified. Also, referring to a graph of FIG. 6B, a case where the reception-side equivalent output impedance $Z_{o,ac}$ is controlled capacitively may be identified.

In FIGS. 6A and 6B, $V_{o,ac}$ may denote a fundamental wave of the reception-side output voltage $V_{o,ac}$ according to FIG. 4, and $I_{o,ac1}$ may denote a fundamental wave of the reception-side induced current $I_{o,ac}$ according to FIG. 4. The other symbols may be interpreted as being the same as the symbols according to FIG. 4, and the same meanings will be applied in the following graphs unless otherwise specified.

In the following description, for the convenience of explanation, the full bridge inverter 40 of the WPT system according to FIG. 4 may be assumed to be controlled at a duty ratio of 50%, and the switching frequencies of the four switches SW1, SW2, SW3, and SW4 included in the full bridge inverter 40 may be assumed to be controlled in accordance with the transmission-side resonance frequency (i.e., zero-phase angle (ZPA) operation). However, embodiments of the present disclosure are not applicable only under such the assumption. That is, the embodiments of the present disclosure should be construed as being applicable to other control situations of the full bridge inverter 40 as well.

A variable for controlling the switching duty of the switches (i.e., the fifth switch and the sixth switch) included in the bridgeless rectifier of FIG. 4 may be defined as β [degrees]. Here, the variable β may mean a phase interval for which the value of the reception-side output voltage $V_{o,ac}$ is controlled to be 0. Also, when the switching duty of the bridgeless rectifier is changed, the energy transferred from the bridgeless rectifier 40 to the EV battery $V_{batt}$ shown in FIG. 4 may also be changed. Therefore, the switching duty of the bridgeless rectifier may be controlled so as to compensate for the voltage fluctuation of the EV battery due to a change of an alignment state between the transmission pad and the reception pad. Since the control variable β (or the switching duty of the bridgeless rectifier) is utilized to compensate for the voltage fluctuation of the EV battery, the voltage $V_{batt}$ and current $I_{batt}$ of the EV battery are measured and based on the measured voltage and/or current, the switching duty of the bridgeless rectifier may be controlled. For example, the switching duty of the bridgeless rectifier (or control variable β) may be primarily controlled so that the measured current $I_{batt}$ of the EV battery is constant (e.g., 10 A) (i.e., constant current control), may be secondarily controlled so that a power (i.e., $P_{batt}=V_{batt} \cdot I_{batt}$) is constant (e.g., 3.3 kW) (i.e., constant power control), and may be finally controlled so that the measure voltage $V_{batt}$ of the EV battery is constant (e.g., 410V) (i.e., constant voltage control). That is, a constant current charging period, a constant power charging period, and a constant voltage charging period may be sequentially present in the charging process, and the charging process may also be referred to as 'CC-CP-CV control'. Here, the constant current control may be abbreviated as 'Constant Current (CC)', the constant voltage control may be abbreviated as 'Constant Power (CP)', and the constant voltage control may be abbreviated as 'Constant Voltage (CV)'.

Meanwhile, a variable for controlling the switching time points (or, starting points) of the switches (i.e., the fifth switch and the sixth switch) included in the bridgeless rectifier of FIG. 4 may be defined as γ [degrees]. Here, the variable γ may be defined as a phase interval from a point (e.g., 60 or 62) where a positive half-period (e.g. 61 or 63) (or, a negative half-period) of the reception-side equivalent output voltage $V_{o,ac}$ (or, the output voltage of the reception-side resonance circuit of FIG. 4) starts to a center of the phase interval according to the variable β.

In this case, when the switching duty of the bridgeless rectifier is controlled such that the phase interval according to the variable β is located right in the middle of the positive half-period of the reception-side output voltages $V_{o,ac}$, the variable γ may become 90°, and a reactance component may not exist in the reception-side equivalent output impedance $Z_{o,ac}$. Here, the absence of the reactance component means that there is no phase difference between the reception-side induced current $I_{o,ac}$ and the reception-side output voltage $V_{o,ac}$, and the transmission-side resonance frequency and the reception-side resonance frequency may coincide with each other. Therefore, when there is no resonance frequency variation even if the alignment state between the transmission pad and the reception pad changes, the switching time points of the bridgeless rectifier may be maintained so that the control variable γ is 90°, and only the switching duty of the bridgeless rectifier may be changed according to the variable β, thereby compensating for the voltage fluctuation of the EV battery.

However, when the transmission-side resonance frequency and the reception-side resonance frequency become different from each other, a reactance component may be generated at the reception-side equivalent output impedance $Z_{o,ac}$. For example, when the switching time points of the bridgeless rectifier are controlled so that the variable γ is larger than 90°, the reception-side equivalent output impedance may be inductive. On the other hand, when the switching time points of the bridgeless rectifier are controlled so that the variable γ is less than 90°, the reception-side equivalent output impedance may be capacitive.

Specifically, the relationship between the transmission-side and the reception-side resonance frequency fluctuations according to the change in the reception-side equivalent output impedance are shown in Table 1 below.

Referring to Table 1, when the reception-side equivalent output impedance $Z_{o,ac}$ becomes inductive (or, the reactance component X is positive) or when the reception-side equivalent output impedance $Z_{o,ac}$ becomes capacitive (or, the reactance component X is negative), the variation of the resonance frequency may be identified.

When the reception-side equivalent output impedance $Z_{o,ac}$ is inductive, an effect similar to inclusion of an additional inductor $L_{Add2}$ in the reception-side equivalent impedance $Z_{22}$ of FIG. 5 may occur. Accordingly, since the denominator increases in the reception-side resonance frequency according to Table 1, the reception-side resonance frequency may be decreased. Here, the reception-side equivalent impedance $Z_{22}$ may correspond to the denominator in the reflected impedance $Z_r$ (see FIG. 5) obtained by projecting the reception-side equivalent impedance to the transmission-side. Therefore, the reflected impedance $Z_r$ has the effect of including an additional capacitor $C_{Add1}$. When the reflected impedance $Z_r$ includes an additional capacitor, the transmission-side resonance frequency may increase since it has the same effect as adding a capacitor in series to the transmission-side. In summary, when the reception-side equivalent output impedance $Z_{o,ac}$ is an inductive element, the reception-side resonance frequency may decrease and the transmission-side resonance frequency may increase.

Also, when the reception-side equivalent output impedance $Z_{o,ac}$ is capacitive, an effect similar to inclusion of an additional capacitor $C_{Add2}$ in the reception-side equivalent impedance $Z_{22}$ of FIG. 5 may occur. Accordingly, since the denominator decreases in the reception-side resonance frequency according to Table 1, the reception-side resonance frequency may be increased. Here, the reception-side equivalent impedance $Z_{22}$ may correspond to the denominator in the reflected impedance $Z_r$ (see FIG. 5) obtained by projecting the reception-side equivalent impedance to the transmission-side. Therefore, the reflected impedance $Z_r$ has the effect of including an additional inductor $L_{Add1}$. When the reflected impedance $Z_r$ includes an additional inductor, the transmission-side resonance frequency may decrease since it has the same effect as adding an inductor in series to

TABLE 1

| | Inductive $Z_{o,ac}$ (X>0) | Capacitive $Z_{o,ac}$ (X<0) |
|---|---|---|
| Reception-side impedance $Z_{22}$ | Inductive → effect of adding $L_{Add2}$ | Capacitive → effect of adding $C_{Add2}$ |
| Reception-side resonance frequency $\omega_2 = \dfrac{1}{\sqrt{L_s C_s}}$ | Add series L in reception-side → resonance frequency decreases $\omega_2 \downarrow = \dfrac{1}{\sqrt{(L_s + L_{Add2})C_s}}$ | Add series C in reception-side → resonance frequency increases $\omega_2 \uparrow = \dfrac{1}{\sqrt{L_s\left(\dfrac{1}{\dfrac{1}{C_s} + \dfrac{1}{C_{Add2}}}\right)}}$ |
| Reflected impedance $Z_r = \dfrac{\omega^2 M^2}{Z_{22}}$ | Capacitive → effect of adding $C_{Add1}$ | Inductive → effect of adding $L_{Add1}$ |
| Transmission-side resonance frequency $\omega_1 = \dfrac{1}{\sqrt{L_p\left(\dfrac{1}{\dfrac{1}{C_p} + \dfrac{1}{C_f}}\right)}}$ | Add series C in transmission-side → resonance frequency increases $\omega_1 \uparrow = \dfrac{1}{\sqrt{L_p\left(\dfrac{1}{\dfrac{1}{C_p} + \dfrac{1}{C_f} + \dfrac{1}{C_{Add1}}}\right)}}$ | Add series L in transmission-side → resonance frequency decreases $\omega_1 \downarrow = \dfrac{1}{\sqrt{(L_p + L_{Add1})\left(\dfrac{1}{\dfrac{1}{C_p} + \dfrac{1}{C_f}}\right)}}$ | the transmission-side. In summary, when the reception-side equivalent output impedance $Z_{o,ac}$ is a capacitive element, the reception-side resonance frequency may increase and the transmission-side resonance frequency may decrease.

Accordingly, assuming the relationship according to Table 1, when it is desired that the transmission-side resonance frequency is decreased and the reception-side resonance frequency is increased, the switching time points of the bridgeless rectifier may be controlled such that the reception-side equivalent output impedance is an inductive element (or, the control variable γ is greater than 90°) as shown in FIG. 6A.

Also, when it is desired that the transmission-side resonance frequency is increased and the reception-side resonance frequency is decreased, the switching time points of the bridgeless rectifier may be controlled such that the reception-side equivalent output impedance is a capacitive element (or, the control variable γ is less than 90°) as shown in FIG. 6B.

FIGS. 7A to 7D are diagrams explaining a method for controlling a switching time point and a duty of a bridgeless rectifier.

Figure 7A:
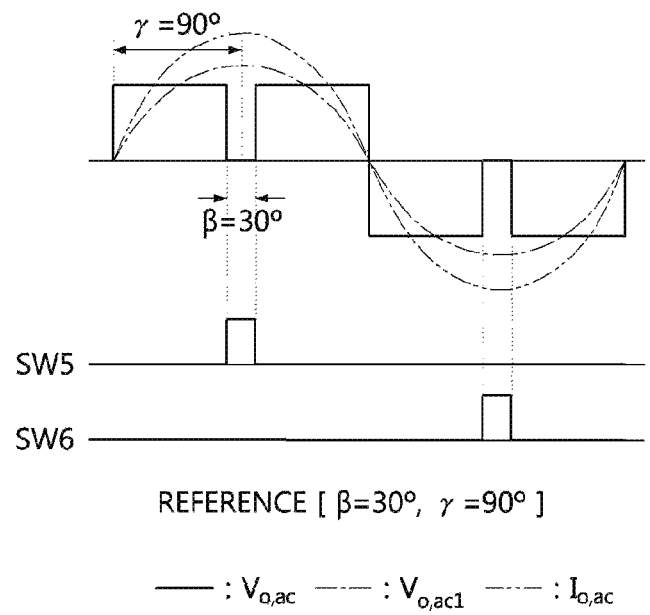
FIGS. 7A to 7D are diagrams explaining a method for controlling a switching time point and a duty of a bridgeless rectifier.

Referring to FIG. 7A, a case where the control variable β is controlled to be 30° when the control variable γ is 90° is identified. Specifically, since the control variable γ is 90°, it may be confirmed that the fifth switch operates in ON state by 90° from a point at which a positive half-period of the reception-side equivalent output voltage $V_{o,ac}$ starts (or, at a center point of the positive half-period). Further, since the control variable R is 30°, a phase interval for which the fifth switch SW5 operates in ON state may be 30°. Particularly, in FIG. 7A, there is no phase difference between the fundamental wave $V_{o,ac}$t of the reception-side output voltage $V_{o,ac}$ and the reception-side output current $I_{o,ac}$. Therefore, when the switching time points of the bridgeless rectifier are controlled so that the control variable γ is 90° as shown in FIG. 7A, it may be confirmed that the reception-side equivalent output impedance $Z_{o,ac}$ does not have a reactance component (or has only a resistance component).

Similarly, since the control variable γ is 90°, it may be confirmed that the sixth switch SW6 operates in ON state by 90° from a point at which a negative half-period of the reception-side equivalent output voltage $V_{o,ac}$ starts (or, a center point of the negative half-period). In this case, a phase interval for which the sixth switch SW6 operates in ON state may be 300 since the control variable β is 30°.

That is, the control variable γ may be used to determine the starting points (or switching time points) at which the fifth switch and the sixth switch included in the bridgeless rectifier operate in ON state, and the control variable R may be used to determine the phase interval (or, switching duty) for which the fifth switch and the sixth switch operate in ON state.

Figure 7B:
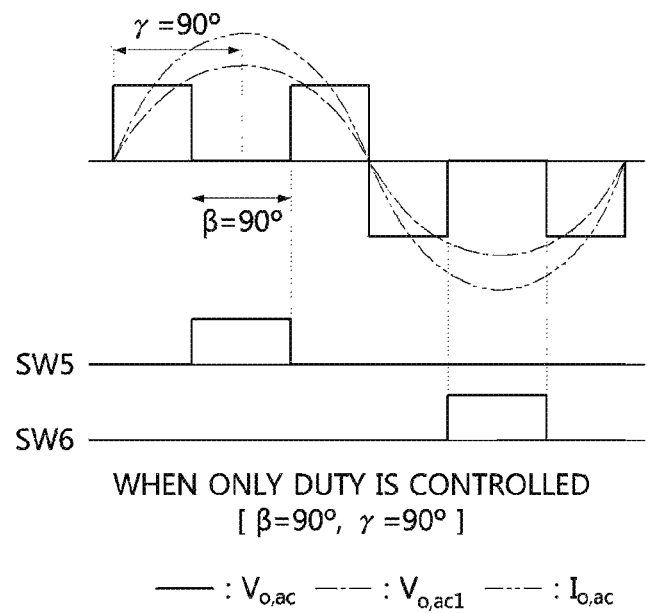

Referring to FIG. 7B, a case where only the switching duty of the bridgeless rectifier is controlled based on the control according to FIG. 7A is identified. That is, a case of controlling only the control variable β to be 90° among the control variables according to FIG. 7A is considered. In FIG. 7B, as in FIG. 7A, the fifth switch and the sixth switch may operate in ON state at the center point of the positive half-period and the center point of the negative half-period of the reception-side equivalent output voltage, respectively. However, the phase interval for which the fifth switch and the sixth switch operate in ON state may be 90°.

Figure 7C:
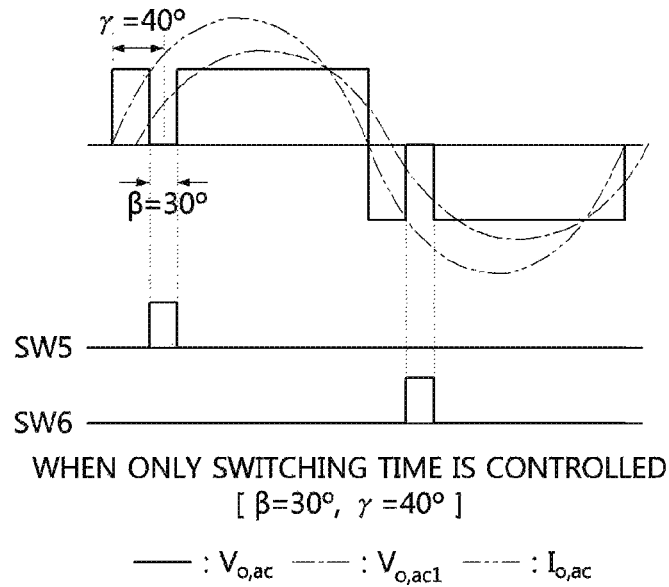

Referring to FIG. 7C, a case where only the switching time points of the bridgeless rectifier are controlled based on the control according to FIG. 7A is identified. That is, a case of controlling only the control variable γ to be 40° among the control variables according to FIG. 7A is considered. In FIG. 7C, the fifth switch and the sixth switch may operate in ON state by 40° from the starting point of the positive half-period and the starting point of the negative half-period of the reception-side equivalent output voltage, respectively. However, the phase interval for which the fifth switch and the sixth switch operate in ON state may be 30° as in the case of FIG. 7A.

Figure 7D:
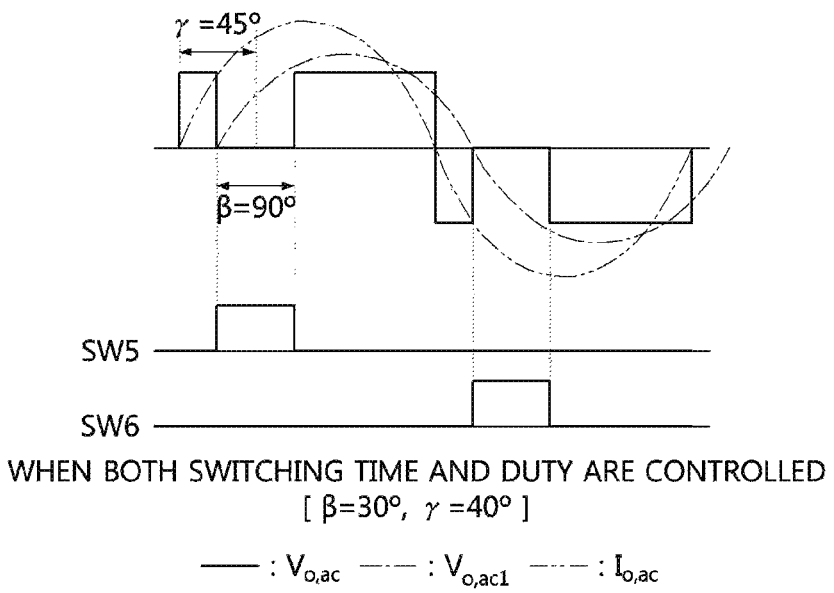

Referring to FIG. 7D, a case where both the switching time point and the switch duty of the bridgeless rectifier are controlled based on the control according to FIG. 7A is identified. That is, a case of controlling the control variable γ to be 45° and the control variable β to be 90° among the control variables according to FIG. 7A is considered. In FIG. 7D, the fifth switch and the sixth switch may operate in ON state by 45° from the starting point of the positive half-period and the starting point of the negative half-period of the reception-side equivalent output voltage, respectively. Also, the phase interval for which the fifth switch and the sixth switch operate in the ON state may be 90°.

Figure 8:
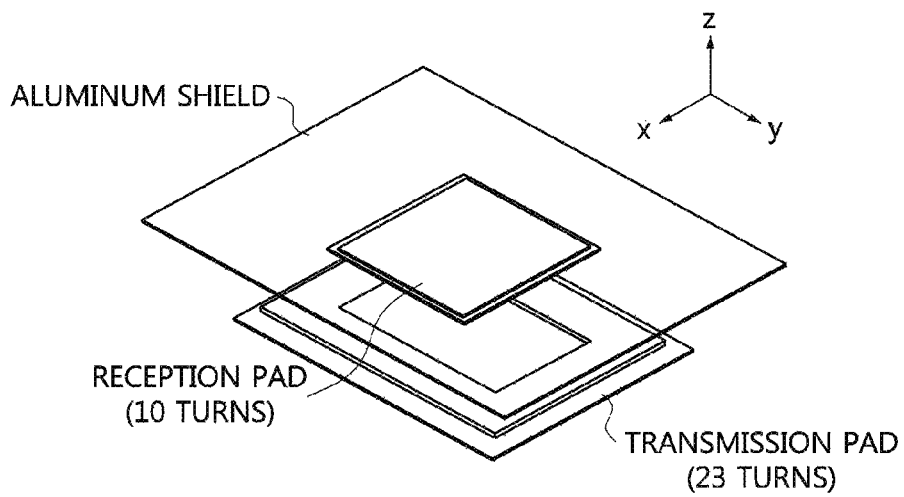
FIG. 8 is a diagram illustrating an example of a magnetic analysis simulation model for identifying inductances of a transmission pad and a reception pad in a WPT system according to embodiments of the present disclosure.
Figure 9:
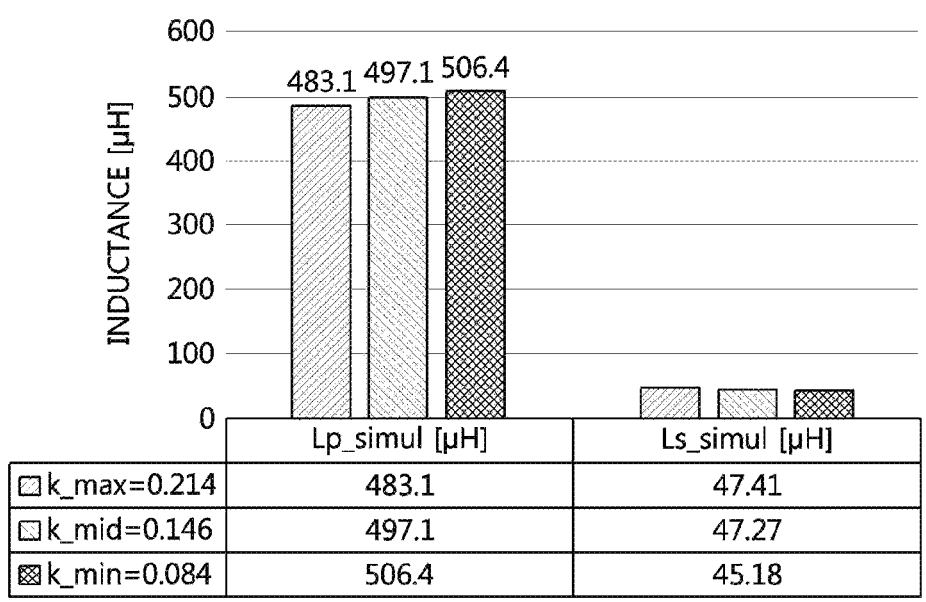
FIG. 9 is a diagram illustrating a simulation result of coupling coefficients based on the simulation model of FIG. 8.

FIG. 8 is a diagram illustrating an example of a magnetic analysis simulation model for identifying inductances of a transmission pad and a reception pad in a WPT system according to embodiments of the present disclosure, and FIG. 9 is a diagram illustrating a simulation result of coupling coefficients based on the simulation model of FIG. 8.

As shown in FIG. 8, experimental conditions for measuring inductances and a coupling coefficient of the transmission coil and the reception coil in the WPT system may be identified. As specific experimental conditions, the transmission pad and reception pad according to the WPT1 dimension of the EV WPT standard SAE J2954 were used, the number of turns of the transmission pad (more specifically, the number of turns of the transmission coil) is 23, and the number of turns of the reception pad (more specifically, the number of turns of the reception coil) is 10. The vertical separation condition (see FIG. 3, z-axis separation distance) between the transmission pad and the reception pad is 95 to 165 mm, and the horizontal separation condition (see FIG. 3, x-y axis separation distance) between the transmission pad and the reception pad is +75 to ±100 mm.

The results of measuring the coupling coefficient between the transmission coil included in the transmission pad and the reception coil included in the reception pad and the inductances of the coils are shown in FIG. 9 within the experimental conditions configured as described above.

When the maximum coupling coefficient was measured, the x, y, and z axis separation distances were 0, 60, and 95 mm, respectively. The maximum value of coupling coefficient $k_{max}$ was measured as 0.214. Under the condition of the maximum coupling coefficient measured, the inductance of the transmission coil was 483.1 µH and the inductance of the reception coil was 47.41H.

When the minimum coupling coefficient was measured, the x, y, and z axis separation distances were 75, 100, and 165 mm, respectively (i.e., each axis separation distance was maximum under the experimental conditions). The minimum value of coupling coefficient $k_{min}$ was measured as 0.084. Under the condition of the minimum coupling coefficient measured, the inductance of the transmission coil was 506.4 µH and the inductance of the reception coil was 45.18 µH.

When the medium coupling coefficient was measured, the x, y, and z axis separation distances were 90, 00, and 100 mm, respectively. The median value of coupling coefficient $k_{mid}$ was measured as 0.146. Under the condition of the medium coupling coefficient measured, the inductance of the transmission coil was 497.1 µH and the inductance of the reception coil was 47.27 µH.

According to the experimental results, the variations of the inductances of the transmission coil and the reception coil are identified according to the maximum value, the minimum value, and the median value of the coupling coefficient. Therefore, the variations of the resonance frequencies and the inductances when the coupling coefficient changes can be predicted based on such the experimental results, and the bridgeless rectifier can be controlled to compensate for the predicted variations.

For example, the WPT system may be designed according to one of a minimum value, a maximum value, and a median value of a coupling coefficient determined within a predetermined allowable alignment range (or a distance between the transmission pad and the reception pad), and the control of the bridgeless rectifier can be performed to compensate for variation of resonance frequencies or a voltage of an EV battery due to a change of alignment state between the transmission pad and the reception pad in the designed WPT system.

Hereinafter, a method for designing the WPT system and a method for controlling the bridgeless rectifier according to the coupling coefficient will be described in detail.

FIGS. 10A to 10D are graphs illustrating a method of controlling a bridgeless rectifier based on a minimum coupling coefficient condition in a WPT system according to embodiments of the present disclosure.

One of control methods to compensate for the resonance frequency variation according to the alignment state of the transmission pad and the reception pad is to design the WPT system based on the allowable minimum coupling coefficient such that the transmission-side resonance frequency and the reception-side resonance frequency are set to the desired frequency.

As a concrete example, the transmission-side resonance frequency and the reception-side resonance frequency may be designed to be 85 kHz based on the minimum coupling coefficient condition (according to the result of FIG. 9), and Table 2 below shows the state change of the WPT system according to the change of the alignment state of the transmission pad and the reception pad.

TABLE 2

| | condition and change | | |
|---|---|---|---|
| system state | Minimum coupling coefficient (design reference point) | Maximum coupling coefficient | Change ratio |
| Transmission-side inductance | 506.4 µH | 483.1 µH | −4.5% |
| Transmission-side resonance frequency | 85 kHz | 87.02 kHz | +2.4% |
| Reception-side inductance | 45.18 µH | 47.41 µH | +4.9% |
| Reception-side resonance frequency | 85 kHz | 82.97 kHz | −1.5% |

Referring to Table 2, when the WPT system (see FIG. 4) is designed so that the transmission-side resonance frequency and the reception-side resonance frequency are 85 kHz based on the minimum coupling coefficient, as the alignment state of the pads changes, the coupling coefficient may be maintained or may increase to the maximum coupling coefficient. If the resonance frequency 85 kHz, which corresponds to the minimum coupling coefficient configured according to the design reference point, remains the same at both the transmission-side and the reception-side, even when the alignment state of the pads varies, the bridgeless rectifier may maintain the control variable γ to be 90° so that the reception-side equivalent output impedance $Z_{o,ac}$ does not have a reactance component, and may compensate for the voltage fluctuation of the EV battery to satisfy a charging profile of the EV battery by changing only the switching duty.

Also, when the alignment state of the pads changes and the coupling coefficient increases up to the maximum coupling coefficient, the transmission-side resonance frequency may increase and the reception-side resonance frequency may decrease as shown in Table 2. Therefore, the switching time points of the bridgeless rectifier may be required to be controlled so that the reception-side equivalent output impedance $Z_{o,ac}$ becomes capacitive in order to decrease the transmission-side resonance frequency and increase the reception-side resonance frequency. In other words, it may be necessary to control the switching time points in the direction in which the control variable γ for the bridgeless rectifier becomes less than 90°.

Here, since it is assumed that the switching frequency of the full bridge inverter 40 according to FIG. 4 is designed to follow the transmission-side resonance frequency, when the coupling coefficient changes from the design condition and the transmission-side resonance frequency and the reception-side resonance frequency are changed, a phase difference may occur between the input voltage $V_{in}$ of the transmission-side resonance circuit 41a and the reception-side output voltages $V_{o,ac}$. Therefore, when it is detected that a phase difference ϕ between the input voltage $V_{in}$ of the transmission-side resonance circuit and the reception-side output voltage $V_{o,ac}$ exists, it may be determined that the transmission-side resonance frequency and the reception-side resonance frequency become different from each other. For example, in the case where the transmission-side resonance frequency and the reception-side resonance frequency of the WPT system are designed to be equal to each other based on the minimum coupling coefficient, if the phase difference ϕ between the input voltage $V_{in}$ of the transmission-side resonance circuit and the reception-side output voltage $V_{o,ac}$ is detected, the switching time points may be controlled in the direction in which the control variable γ of the bridgeless rectifier becomes less than 90°. In this case, the control of the switching time points may be performed until the phase difference becomes 0.

Figure 10A:
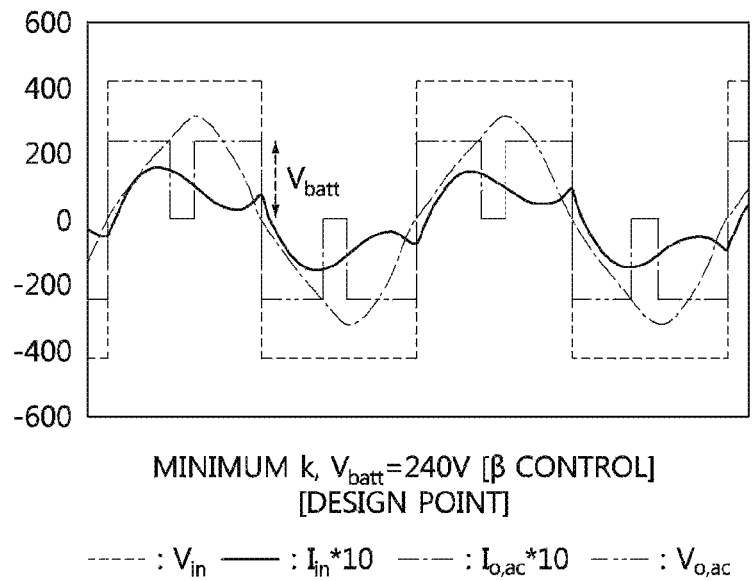
FIGS. 10A to 10D are graphs illustrating a method of controlling a bridgeless rectifier based on a minimum coupling coefficient condition in a WPT system according to embodiments of the present disclosure.

Referring to FIG. 10A, when the design conditions are satisfied on the basis of the minimum coupling coefficient, periods of the input voltage $V_{in}$ of the transmission-side resonance circuit and the reception-side output voltage $V_{o,ac}$ may coincide with each other, and the phase difference ϕ may not exist.

Figure 10B:
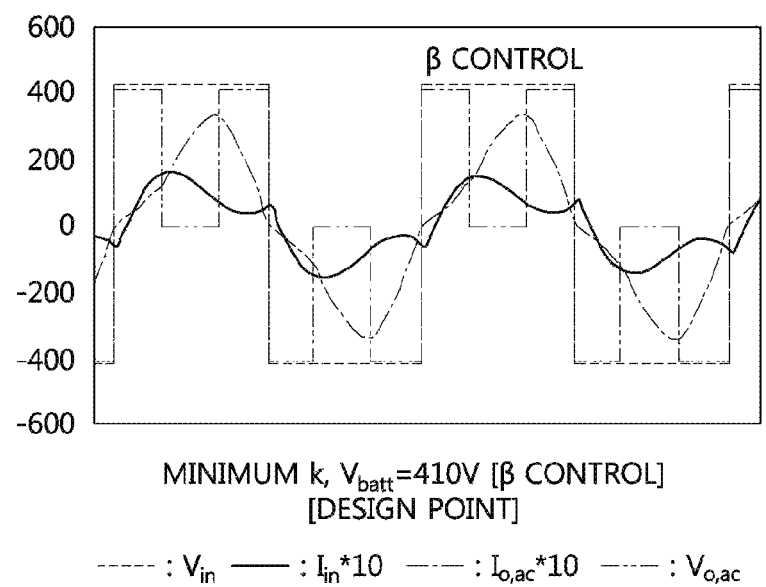

Referring to FIG. 10B, although the alignment state of the pads is changed under the design conditions shown in FIG. 10A and the voltage of the EV battery is changed, the phase difference does not exist. In this case, since there is no change in the resonance frequency based on the minimum coupling coefficient, only the switching duty (or the control variable β) of the bridgeless rectifier may be controlled to compensate for the variation of the voltage $V_{batt}$ of the EV battery.

Figure 10C:
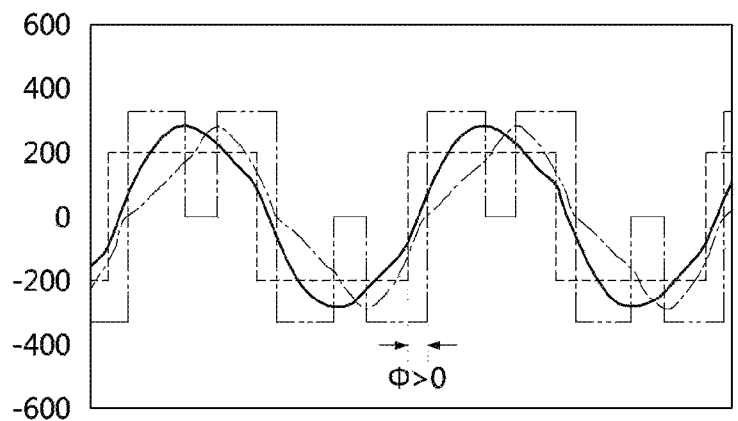
Figure 10D:
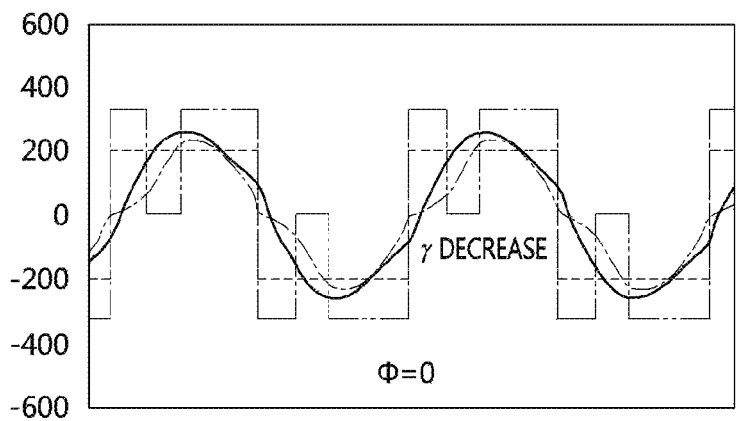

Referring to FIGS. 10C and 10D, as the alignment state of the pads changes, the coupling coefficient increases from the minimum coupling coefficient, which is the design reference condition, to the maximum coupling coefficient. In this case, in FIG. 10C, it may be identified that the phase difference ϕ still exists as an example of the case where only the switching duty (i.e., control variable β) of the bridgeless rectifier is controlled. On the other hand, referring to FIG. 10D, since both the switching duty and the switching time points of the bridgeless rectifier are controlled (in the direction in which the control variable γ becomes less than 90°), it is identified that the phase difference ϕ does not occur.

FIGS. 11A to 11D are graphs illustrating a method of controlling a bridgeless rectifier based on a maximum coupling coefficient condition in a WPT system according to embodiments of the present disclosure.

One of control methods to compensate for the resonance frequency variation according to the alignment state of the transmission pad and the reception pad is to design the WPT system based on the allowable maximum coupling coefficient such that the transmission-side resonance frequency and the reception-side resonance frequency are set to the desired frequency.

As a concrete example, the transmission-side resonance frequency and the reception-side resonance frequency may be designed to be 85 kHz based on the maximum coupling coefficient condition (according to the result of FIG. 9), and Table 3 below shows the state change of the WPT system according to the change of the alignment state of the transmission pad and the reception pad.

TABLE 3

| system state | condition and change | | |
|---|---|---|---|
| | Maximum coupling coefficient (design reference point) | Minimum coupling coefficient | Change ratio |
| Transmission-side inductance | 483.1 μH | 506.4 μH | +4.82% |
| Transmission-side resonance frequency | 85 kHz | 83.02 kHz | −2.33% |
| Reception-side inductance | 47.41 μH | 45.18 μH | −4.70% |
| Reception-side resonance frequency | 85 kHz | 82.97 kHz | +2.44% |

Referring to Table 3, when the WPT system (see FIG. 4) is designed so that the transmission-side resonance frequency and the reception-side resonance frequency are 85 kHz based on the maximum coupling coefficient, as the alignment state of the pads changes, the coupling coefficient may be maintained or may decrease up to the minimum coupling coefficient. If the resonance frequency 85 kHz, which corresponds to the maximum coupling coefficient configured according to the design reference point, remains the same at both the transmission-side and the reception-side, even when the alignment state of the pads varies, the bridgeless rectifier may maintain the control variable γ to be 90° so that the reception-side equivalent output impedance $Z_{o,ac}$ does not have a reactance component, and may compensate for the voltage fluctuation of the EV battery to satisfy a charging profile of the EV battery by changing only the switching duty.

Also, when the alignment state of the pads changes and the coupling coefficient decreases to the minimum coupling coefficient, the transmission-side resonance frequency may decrease and the reception-side resonance frequency may increase as shown in Table 3. Therefore, the switching time points of the bridgeless rectifier may be required to be controlled so that the reception-side equivalent output impedance $Z_{o,ac}$ becomes inductive in order to increase the transmission-side resonance frequency and decrease the reception-side resonance frequency. In other words, it may be necessary to control the switching time points in the direction in which the control variable γ for the bridgeless rectifier becomes larger than 90°.

Here, since it is assumed that the switching frequency of the full bridge inverter 40 according to FIG. 4 is designed to follow the transmission-side resonance frequency, when the coupling coefficient changes from the design condition and the transmission-side resonance frequency and the reception-side resonance frequency are changed, a phase difference may occur between the input voltage $V_{in}$ of the transmission-side resonance circuit 41a and the reception-side output voltages $V_{o,ac}$. Therefore, when it is detected that a phase difference ϕ between the input voltage $V_{in}$ of the transmission-side resonance circuit and the reception-side output voltage $V_{o,ac}$ exists, it may be determined that the transmission-side resonance frequency and the reception-side resonance frequency become different from each other. For example, in the case where the transmission-side resonance frequency and the reception-side resonance frequency of the WPT system are designed to be equal to each other based on the maximum coupling coefficient, if the phase difference ϕ between the input voltage $V_{in}$ of the transmission-side resonance circuit and the reception-side output voltage $V_{o,ac}$ is detected, the switching time points may be controlled in the direction in which the control variable γ of the bridgeless rectifier becomes larger than 90°. In this case, the control of the switching time points may be performed until the phase difference becomes 0.

Figure 11A:
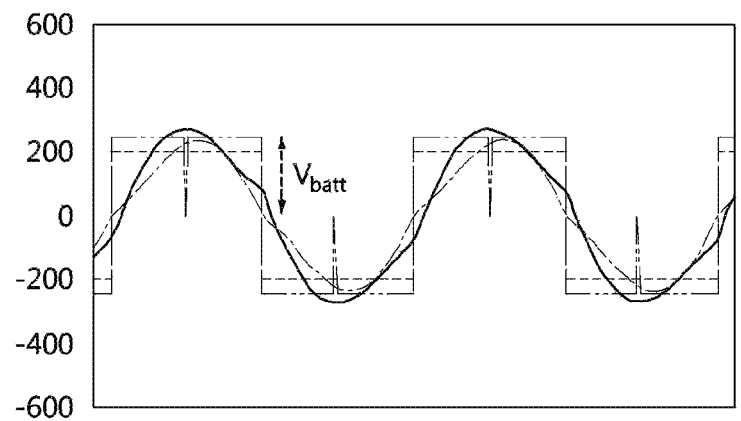
FIGS. 11A to 11D are graphs illustrating a method of controlling a bridgeless rectifier based on a maximum coupling coefficient condition in a WPT system according to embodiments of the present disclosure.

Referring to FIG. 11A, when the design conditions are satisfied on the basis of the maximum coupling coefficient, periods of the input voltage $V_{in}$ of the transmission-side resonance circuit and the reception-side output voltage $V_{o,ac}$ may coincide with each other, and the phase difference ϕ may not exist.

Figure 11B:
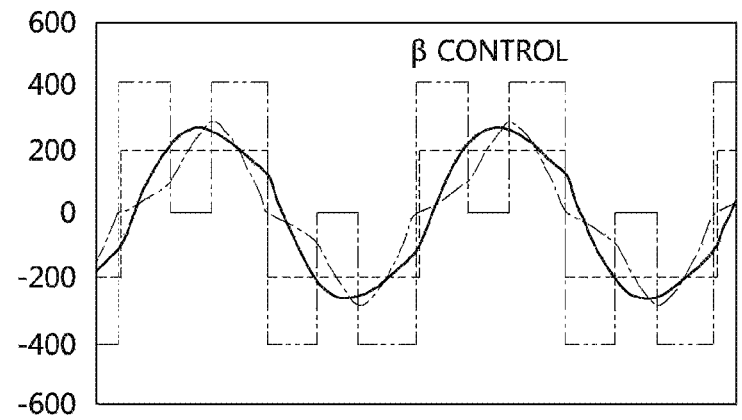

Referring to FIG. 11B, although the alignment state of the pads is changed under the design conditions shown in FIG. 11A and the voltage of the EV battery is changed, the phase difference does not exist. In this case, since there is no change in the resonance frequency based on the maximum coupling coefficient, only the switching duty (or the control variable β) of the bridgeless rectifier may be controlled to compensate for the variation of the voltage $V_{batt}$ of the EV battery.

Figure 11C:
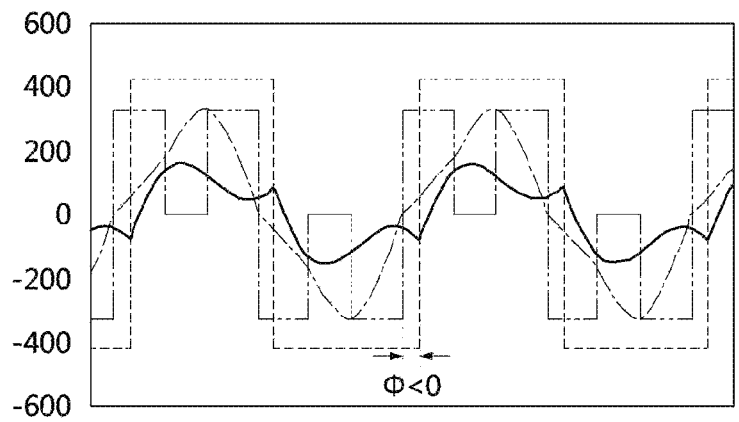
Figure 11D:
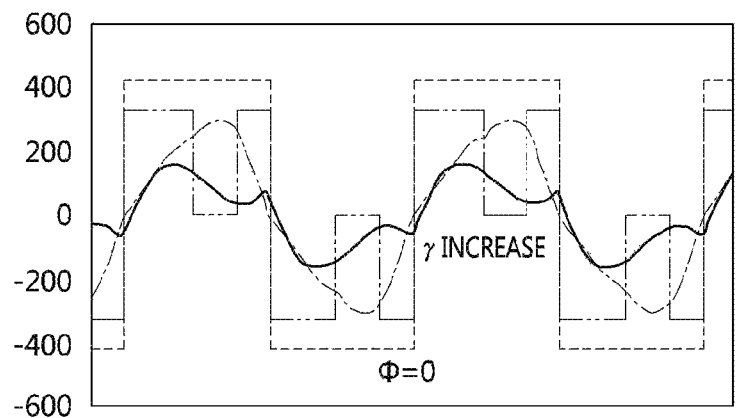

Referring to FIGS. 11C and 11D, as the alignment state of the pads changes, the coupling coefficient decreases from the maximum coupling coefficient, which is the design reference condition, up to the minimum coupling coefficient. In this case, in FIG. 11C, it may be identified that the phase difference ϕ still exists as an example of the case where only the switching duty (i.e., control variable β) of the bridgeless rectifier is controlled. On the other hand, referring to FIG. 11D, since both the switching duty and the switching time points of the bridgeless rectifier are controlled (in the direction in which the control variable γ becomes larger than 90°), it is identified that the phase difference ϕ does not occur.

FIGS. 12A to 12F are graphs illustrating a method of controlling a bridgeless rectifier based on a medium coupling coefficient condition in a WPT system according to embodiments of the present disclosure.

One of control methods to compensate for the resonance frequency variation according to the alignment state of the transmission pad and the reception pad is to design the WPT system based on the allowable medium coupling coefficient such that the transmission-side resonance frequency and the reception-side resonance frequency are set to the desired frequency.

As a concrete example, the transmission-side resonance frequency and the reception-side resonance frequency may be designed to be 85 kHz based on the medium coupling coefficient condition (according to the result of FIG. 9), and Table 4 below shows the state change of the WPT system according to the change of the alignment state of the transmission pad and the reception pad.

TABLE 4

| System state | condition and change | | |
|---|---|---|---|
| | Minimum coupling coefficient (change ratio) | Medium coupling coefficient (design reference point) | Maximum coupling coefficient (change ratio) |
| Transmission-side inductance | 506.4 µH | 497.1 µH | 483.1 µH |
| Transmission-side resonance frequency | 84.22 kHz (−0.92%) | 85 kHz | 86.2 kHz (+1.44%) |
| Reception-side inductance | 45.18 µH | 47.27 µH | 47.41 µH |
| Reception-side resonance frequency | 87.07 kHz (+2.29%) | 85 kHz | 84.9 kHz (−0.15%) |

Referring to Table 4, when the WPT system (see FIG. 4) is designed so that the transmission-side resonance frequency and the reception-side resonance frequency are 85 kHz based on the medium coupling coefficient, as the alignment state of the pads changes, the coupling coefficient may be maintained, or may be changed up to the minimum coupling coefficient or the maximum coupling coefficient. If the resonance frequency 85 kHz, which corresponds to the medium coupling coefficient configured according to the design reference point, remains the same at both the transmission-side and the reception-side, even when the alignment state of the pads varies, the bridgeless rectifier may maintain the control variable γ to 90° so that the reception-side equivalent output impedance $Z_{o,ac}$ does not have a reactance component, and may compensate for the voltage fluctuation of the EV battery to satisfy a charging profile of the EV battery by changing only the switching duty.

Also, as the alignment state of the pads changes, the coupling coefficient may be decreased up to the minimum coupling coefficient. In this case, the switching time points of the bridgeless rectifier may be required to be controlled so that the reception-side equivalent output impedance $Z_{o,ac}$ becomes inductive. In other words, when a phase difference between the input voltage $V_{in}$ of the transmission-side resonance circuit 41a and the reception-side output voltage $V_{o,ac}$ occurs, it may be necessary to control the switching time points in the direction in which the control variable γ for the bridgeless rectifier becomes larger than 90°.

Also, as the alignment state of the pads changes, the coupling coefficient may be increased up to the maximum coupling coefficient. In this case, the switching time points of the bridgeless rectifier may be required to be controlled so that the reception-side equivalent output impedance $Z_{o,ac}$ becomes capacitive. In other words, when a phase difference between the input voltage $V_{in}$ of the transmission-side resonance circuit 41a and the reception-side output voltage $V_{o,ac}$ occurs, it may be necessary to control the switching time points in the direction in which the control variable γ for the bridgeless rectifier becomes less than 90°.

On the other hand, when designing the WPT system based on the medium coupling coefficient, it may be difficult to predict whether the coupling coefficient increases or decreases. In this case, the control direction may be determined using the fact that the phase difference between the input voltage $V_{in}$ of the transmission-side resonance circuit 41a and the reception-side output voltage $V_{o,ac}$ generally increases when the coupling coefficient increases. For example, as the phase difference increases, the coupling coefficient increases, so that the switching time points may be controlled in a direction in which the control variable γ for the bridgeless rectifier becomes less than 90°. On the other hand, as the phase difference decreases, the coupling coefficient decreases, so that the switching time points may be controlled in a direction in which the control variable γ for the bridgeless rectifier becomes larger than 90°.

Figure 12A:
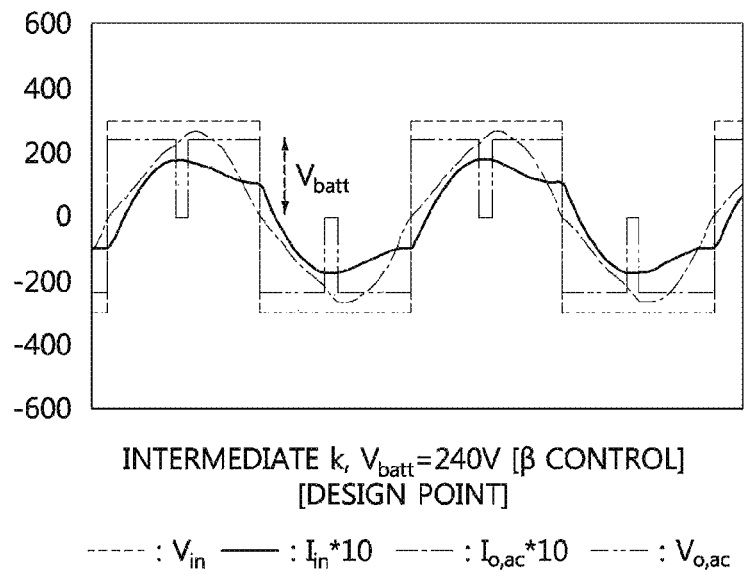
FIGS. 12A to 12F are graphs illustrating a method of controlling a bridgeless rectifier based on a medium coupling coefficient condition in a WPT system according to embodiments of the present disclosure.

Referring to FIG. 12A, when the design conditions are satisfied on the basis of the medium coupling coefficient, periods of the input voltage $V_{in}$ of the transmission-side resonance circuit and the reception-side output voltage $V_{o,ac}$ may coincide with each other, and the phase difference ϕ may not exist.

Figure 12B:
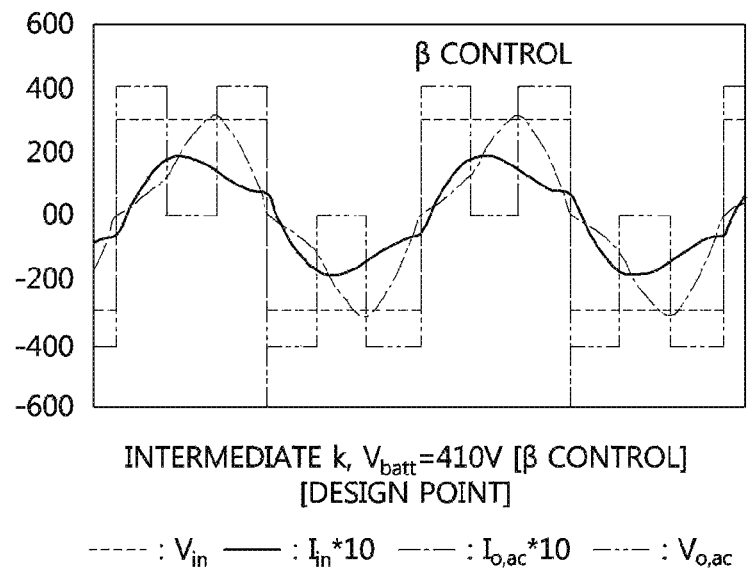

Referring to FIG. 12B, although the alignment state of the pads is changed under the design conditions shown in FIG. 12A and the voltage of the EV battery is changed, the phase difference does not exist. In this case, only the switching duty (or the control variable β) of the bridgeless rectifier may be controlled to compensate for the variation of the voltage $V_{batt}$ of the EV battery.

Figure 12C:
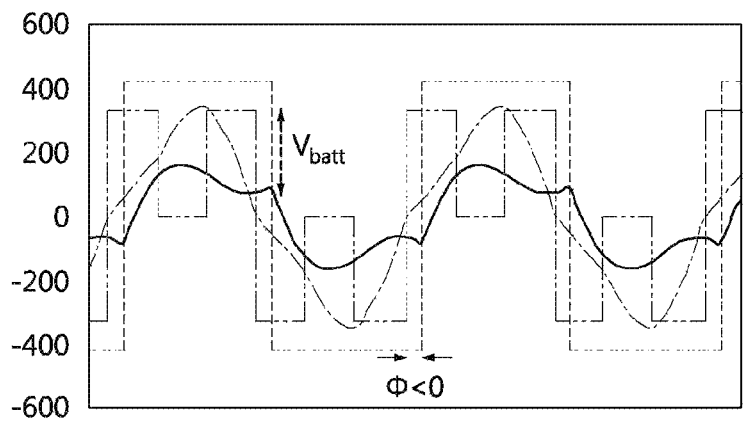
Figure 12D:
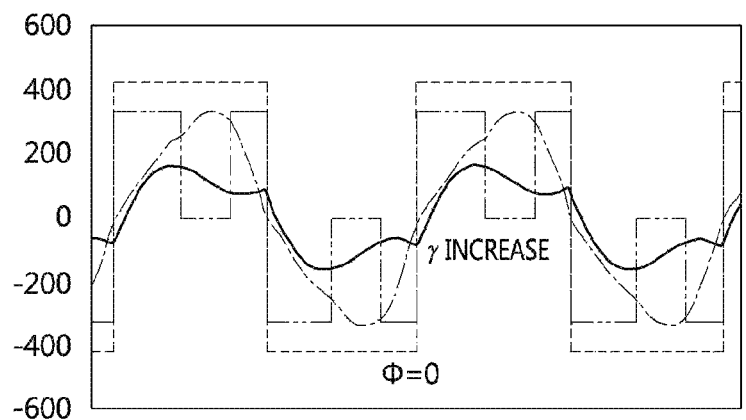

Referring to FIGS. 12C and 12D, as the alignment state of the pads changes, the coupling coefficient decreases from the medium coupling coefficient, which is the design reference condition, to the minimum coupling coefficient. In this case, in FIG. 12C, it may be identified that the phase difference ϕ still exists as an example of the case where only the switching duty (i.e., control variable β) of the bridgeless rectifier is controlled. On the other hand, referring to FIG. 12D, since both the switching duty and the switching time points of the bridgeless rectifier are controlled (in the direction in which the control variable γ becomes larger than 90°), it is identified that the phase difference ϕ does not occur.

Figure 12E:
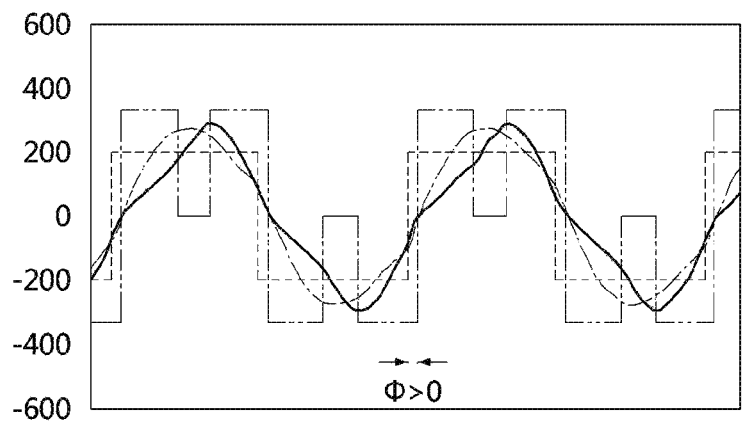
Figure 12F:
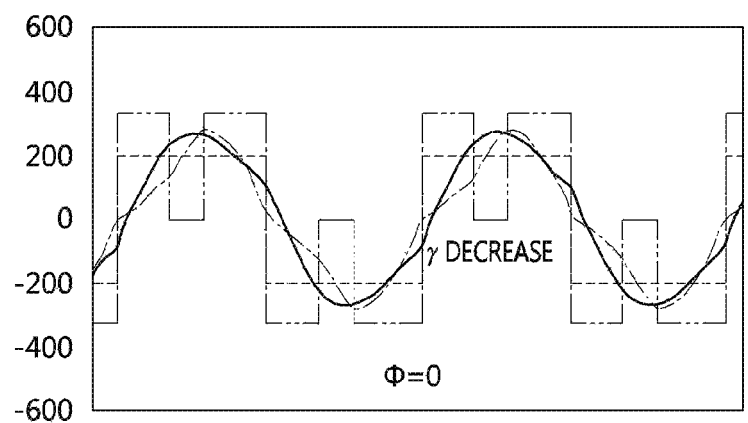

Referring to FIGS. 12E and 12F, as the alignment state of the pads changes, the coupling coefficient increases from the medium coupling coefficient, which is the design reference condition, to the maximum coupling coefficient. In this case, in FIG. 12E, it may be identified that the phase difference ϕ still exists as an example of the case where only the switching duty (i.e., control variable β) of the bridgeless rectifier is controlled. On the other hand, referring to FIG. 12F, since both the switching duty and the switching time points of the bridgeless rectifier are controlled (in the direction in which the control variable γ becomes less than 90°), it is identified that the phase difference φ does not occur.

FIG. 13 is a flowchart illustrating a method for controlling WPT to an EV using a bridgeless rectifier according to embodiments of the present disclosure.

As shown in FIG. 13, a method of controlling WPT to an EV using a bridgeless rectifier may include a step S100 of detecting a phase difference between an input voltage of a transmission-side resonance circuit and an output voltage of a reception-side resonance circuit, a step S110 of predicting a resonance frequency change direction according to a preconfigured design condition when the phase difference is detected, and a step S120 of controlling switching time points of switches included in the bridgeless rectifier in a direction compensating for the predicted change direction.

The bridgeless rectifier may include a first rectifier circuit in which a first diode and a first switch are connected in series and a second rectifier circuit in which a second diode and a second switch are connected in series. Here, the first diode may denote the first diode D1 according to FIG. 4, the first switch may denote the fifth switch SW5 according to FIG. 4, the second diode may denote the second diode D2 according to FIG. 4, and the second switch may denote the sixth switch SW6 according to FIG. 4.

The first rectifier circuit and the second rectifier circuit may be connected in parallel with each other.

The transmission-side resonance circuit and the reception-side resonance circuit may be configured to satisfy a target resonance frequency set in accordance with one of a minimum value, a maximum value and a median value of a coupling coefficient derived within an allowable separation range between a transmission pad and a reception pad.

The output voltage of the reception-side resonance circuit may be applied to the bridgeless rectifier as a voltage difference between a node between the first diode and the first switch and a node between the second diode and the second switch.

The step S120 of controlling the switching time points of the switches may include a step of controlling time points at which the first switch and the second switch operate.

In the step S120 of controlling the switching time points of the switches, when the transmission-side resonance circuit and the reception-side resonance circuit are configured to satisfy the target resonance frequency set in accordance with the minimum value of the coupling coefficient, the switching time points of the switches may be changed in a direction in which the phase of the output voltage decreases by 90° after a time point when a positive half-period or a negative half-period of the output voltage starts.

In the step S120 of controlling the operation time points of the switches, when the transmission-side resonance circuit and the reception-side resonance circuit are configured to satisfy the target resonance frequency set in accordance with the maximum value of the coupling coefficient, the switching time points of the switches may be changed in a direction in which the phase of the output voltage increases by 90° after a time point when a positive half-period or a negative half-period of the output voltage starts.

If a phase difference is not detected after the step S100, the switches may be controlled such that a point of 90° after the starting time point of the positive half-period or the negative half-period of the output voltage becomes a center point at which the switches operate.

In addition, the method of controlling WPT to an EV using the bridgeless rectifier may further comprise a step of detecting a voltage and a current of an EV battery to which the output current of the bridgeless rectifier is transferred, and a step of controlling a switching duty of the switches when the detected voltage or current does not meet predetermined requirements.

If a phase difference is not detected after the step S100, the switches may be controlled such that a point of 90° after the starting time point of the positive half-period or the negative half-period of the output voltage becomes a center point at which the switches operate.

FIG. 14 is a block diagram illustrating an apparatus for controlling WPT to an EV using a bridgeless rectifier according to embodiments of the present disclosure.

As shown in 14, an apparatus 100 for controlling WPT to an EV using a bridgeless rectifier may include a processor 110 and a memory 120 storing instructions causing the processor 110 to perform at least one step.

Also, the apparatus 100 may further include a transceiver 130 performing communications through a wireless network or a wired network. Also, the apparatus 100 may further include an input interface device 140, an output interface device 150, a storage device 160, and the like. Each component included in the apparatus 100 may be connected by a bus 170 to communicate with each other.

Here, the processor 110 may refer to a central processing unit (CPU), a graphics processing unit (GPU), or a dedicated processor on which methods according to embodiments of the present disclosure are performed. Each of the memory 120 and the storage device 160 may be constituted of at least one of a volatile storage medium and a nonvolatile storage medium.

For example, the memory 120 may comprise at least one of a read only memory (ROM) and a random access memory (RAM).

The at least one step may comprise a step of detecting a phase difference between an input voltage of a transmission-side resonance circuit and an output voltage of a reception-side resonance circuit, a step of predicting a resonance frequency change direction according to a preconfigured design condition when the phase difference is detected, and a step of controlling switching time points of switches included in the bridgeless rectifier in a direction compensating for the predicted change direction.

The bridgeless rectifier may include a first rectifier circuit in which a first diode and a first switch are connected in series and a second rectifier circuit in which a second diode and a second switch are connected in series. The first rectifier circuit and the second rectifier circuit may be connected in parallel with each other.

The transmission-side resonance circuit and the reception-side resonance circuit may be configured to satisfy a target resonance frequency set in accordance with one of a minimum value, a maximum value and a median value of a coupling coefficient derived within an allowable separation range between a transmission pad and a reception pad.

The output voltage of the reception-side resonance circuit may be applied to the bridgeless rectifier as a voltage difference between a node between the first diode and the first switch and a node between the second diode and the second switch.

The step of controlling the switching time points of the switches may include a step of controlling time points at which the first switch and the second switch operate.

In the step of controlling the operation time points of the switches, when the transmission-side resonance circuit and the reception-side resonance circuit are configured to satisfy the target resonance frequency set in accordance with the minimum value of the coupling coefficient, the switching time points of the switches may be changed in a direction in which the phase of the output voltage decreases by 90° after a time point when a positive half-period or a negative half-period of the output voltage starts.

In the step of controlling the operation time points of the switches, when the transmission-side resonance circuit and the reception-side resonance circuit are configured to satisfy the target resonance frequency set in accordance with the maximum value of the coupling coefficient, the switching time points of the switches may be changed in a direction in which the phase of the output voltage increases by 90° after a time point when a positive half-period or a negative half-period of the output voltage starts.

If a phase difference is not detected after the step of detecting the phase difference, the switches may be controlled such that a point of 90° after the starting time point of the positive half-period or the negative half-period of the output voltage becomes a center point at which the switches operate.

In addition, the method of controlling WPT to an EV using the bridgeless rectifier may further comprise a step of detecting a voltage and a current of an EV battery to which the output current of the bridgeless rectifier is transferred, and a step of controlling a switching duty of the switches when the detected voltage or current does not meet predetermined requirements.

If a phase difference is not detected after the step of detecting the phase difference, the switches may be controlled such that a point of 90° after the starting time point of the positive half-period or the negative half-period of the output voltage becomes a center point at which the switches operate.

The apparatus 100 for controlling WPT using an EV using a bridgeless rectifier may be incorporated in the charging station according to FIG. 1 or may be incorporated in the EV according to FIG. 1.

When the apparatus 100 is incorporated in the charging station, a message indicating the switching time points and duty of the switches included in the bridgeless rectifier may be transmitted from the charging station to the EV (or, a communication module included in the EV).

Also, when the apparatus 100 is incorporated in the EV, the apparatus 100 may be implemented as a separate device within the EV, or may be implemented in combination with individual components of the EV. For example, according to one embodiment of the present disclosure, an EV that controls WPT using a bridgeless rectifier may be provided.

In this case, the EV controlling WPT using a bridgeless rectifier may include a processor, a memory storing instructions causing the processor to perform at least one step, a reception-side resonance circuit coupled electromagnetically with a transmission coil and receiving wireless power from the transmission coil, a bridgeless rectifier rectifying an output current of the reception-side resonance circuit and outputting the rectified current, and a battery for receiving and storing the output of the bridgeless rectifier and supplying energy to the EV.

The at least one step may comprise a step of detecting a phase difference between an input voltage of a transmission-side resonance circuit and an output voltage of a reception-side resonance circuit, a step of predicting a resonance frequency change direction according to a preconfigured design condition when the phase difference is detected, and a step of controlling switching time points of switches included in the bridgeless rectifier in a direction compensating for the predicted change direction.

The bridgeless rectifier may include a first rectifier circuit in which a first diode and a first switch are connected in series and a second rectifier circuit in which a second diode and a second switch are connected in series. The first rectifier circuit and the second rectifier circuit may be connected in parallel with each other.

In addition, the at least one step may comprise the method or steps according to FIG. 13.

According to the methods and apparatuses for controlling WPT to an EV using a bridgeless rectifier, as described herein, the charging efficiency can be improved by compensating for the variation of the alignment state and the resonance frequency occurring in the EV charging process. In particular, since the bridgeless rectifier is controlled so that the transmission-side resonance frequency and the reception-side resonance frequency coincide with each other, the WPT can be performed with high efficiency.

Also, when the design point is set as the maximum coupling coefficient or the minimum coupling coefficient, the bridgeless rectifier can be controlled in a unidirectional manner, thereby reducing a control difficulty. Also, when the design point is set as the medium coupling coefficient, the bridgeless rectifier can be controlled in both directions, whereby the resonance frequency variation can be compensated even when the resonance frequency variation is large.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present disclosure or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present disclosure, and vice versa. Also, the above-described method or apparatus may be implemented by combining all or a part of the structure or functions, or may be implemented separately.

Furthermore, the above-mentioned method or apparatus may be implemented by combining all or a part of the configuration or function, or may be implemented separately.

While the embodiments of the present disclosure and their advantages have been described in detail, it should be understood that various changes, substitutions, and alterations may be made herein without departing from the scope of the present disclosure.

What is claimed is:

1. A method for controlling wireless power transfer to an electric vehicle (EV) using a bridgeless rectifier, the method comprising:
   detecting a phase difference between an input voltage of a transmission-side resonance circuit and an output voltage of a reception-side resonance circuit;
   after detecting the phase difference, predicting a resonance frequency change direction according to a preconfigured design condition; and controlling switching time points of switches included in the bridgeless rectifier in a direction compensating for the predicted change direction,
wherein the switching time points are changed in a direction in which a phase of the output voltage of the reception-side resonance circuit decreases or increases so that a point of 90° after a positive half-period or a negative half-period of the output voltage starts becomes a center point at which the switches operate.

2. The method according to claim 1, wherein the bridgeless rectifier includes a first rectifier circuit in which a first diode and a first switch are connected in series and a second rectifier circuit in which a second diode and a second switch are connected in series, and the first rectifier circuit and the second rectifier circuit are connected in parallel with each other.

3. The method according to claim 2, wherein the transmission-side resonance circuit and the reception-side resonance circuit are configured to satisfy a target resonance frequency set in accordance with one of a minimum value, a maximum value, and a median value of a coupling coefficient derived within an allowable separation range between a transmission pad and a reception pad.

4. The method according to claim 2, wherein the output voltage of the reception-side resonance circuit is applied to the bridgeless rectifier as a voltage difference between a node located between the first diode and the first switch and a node located between the second diode and the second switch.

5. The method according to claim 3, wherein the controlling of the switching time points of the switches comprises controlling time points at which the first switch and the second switch operate.

6. The method according to claim 3, wherein, when the transmission-side resonance circuit and the reception-side resonance circuit are configured to satisfy the target resonance frequency set in accordance with the minimum value of the coupling coefficient, the switching time points of the switches are changed in a direction in which a phase of the output voltage of the reception-side resonance circuit decreases by 90° after a positive half-period or a negative half-period of the output voltage starts.

7. The method according to claim 3, wherein, when the transmission-side resonance circuit and the reception-side resonance circuit are configured to satisfy the target resonance frequency set in accordance with the maximum value of the coupling coefficient, the switching time points of the switches are changed in a direction in which a phase of the output voltage of the reception-side resonance circuit increases by 90° after a positive half-period or a negative half-period of the output voltage starts.

8. The method according to claim 1, wherein the switches are controlled so that a point of 90° after a positive half-period or a negative half-period of the output voltage starts becomes a center point at which the switches operate.

9. The method according to claim 1, further comprising:
detecting a voltage and a current of an EV battery to which an output current of the bridgeless rectifier is transferred; and
controlling a switching duty of the switches when the detected voltage or current does not satisfy a predetermined requirement.

10. An apparatus for controlling wireless power transfer to an electric vehicle (EV) using a bridgeless rectifier, the apparatus comprising:
a processor; and
a memory storing instructions executable by the processor,
wherein, when the instructions are executed, the processor is configured to:
detect a phase difference between an input voltage of a transmission-side resonance circuit and an output voltage of a reception-side resonance circuit;
after detecting the phase difference, predict a resonance frequency change direction according to a preconfigured design condition; and
control switching time points of switches included in the bridgeless rectifier in a direction compensating for the predicted change direction, and
wherein the switching time points are changed in a direction in which a phase of the output voltage of the reception-side resonance circuit decreases or increases so that a point of 90° after a positive half-period or a negative half-period of the output voltage starts becomes a center point at which the switches operate.

11. The apparatus according to claim 10, wherein the bridgeless rectifier includes a first rectifier circuit in which a first diode and a first switch are connected in series and a second rectifier circuit in which a second diode and a second switch are connected in series, and the first rectifier circuit and the second rectifier circuit are connected in parallel with each other.

12. The apparatus according to claim 11, wherein the transmission-side resonance circuit and the reception-side resonance circuit are configured to satisfy a target resonance frequency set in accordance with one of a minimum value, a maximum value and a median value of a coupling coefficient derived within an allowable separation range between a transmission pad and a reception pad.

13. The apparatus according to claim 11, wherein the output voltage of the reception-side resonance circuit is applied to the bridgeless rectifier as a voltage difference between a node located between the first diode and the first switch and a node located between the second diode and the second switch.

14. The apparatus according to claim 12, wherein the controlling of the switching time points of the switches comprises controlling time points at which the first switch and the second switch operate.

15. The apparatus according to claim 12, wherein, when the transmission-side resonance circuit and the reception-side resonance circuit are configured to satisfy the target resonance frequency set in accordance with the minimum value of the coupling coefficient, the switching time points of the switches are changed in a direction in which a phase of the output voltage of the reception-side resonance circuit decreases by 90° after a positive half-period or a negative half-period of the output voltage starts.

16. The apparatus according to claim 12, wherein, when the transmission-side resonance circuit and the reception-side resonance circuit are configured to satisfy a target resonance frequency set in accordance with the maximum value of the coupling coefficient, the switching time points of the switches are changed in a direction in which a phase of the output voltage of the reception-side resonance circuit increases by 90° after a positive half-period or a negative half-period of the output voltage starts.

17. The apparatus according to claim 10, wherein, the switches are controlled so that a point of 90° after a positive half-period or a negative half-period of the output voltage starts becomes a center point at which the switches operate.

18. The apparatus according to claim 10, wherein the processor is further configured to:

detect a voltage and a current of an EV battery to which an output current of the bridgeless rectifier is transferred; and control a switching duty of the switches when the detected voltage or current does not satisfy a predetermined requirement.

19. An electric vehicle (EV) for controlling wireless power transfer to the EV using a bridgeless rectifier, the EV comprising:

a processor;

a memory storing instructions executable by the processor;

a reception-side resonance circuit coupled with a transmission coil and configured to receive wireless power from the transmission coil;

a bridgeless rectifier configured to rectify an output current of the reception-side resonance circuit and to output the rectified current; and a battery configured to receive and store the output of the bridgeless rectifier and to supply energy to the EV, wherein, when the instructions are executed, the processor is configured to:

detect a phase difference between an input voltage of a transmission-side resonance circuit and an output voltage of a reception-side resonance circuit;

after detecting the phase difference, predict a resonance frequency change direction according to a preconfigured design condition; and control switching time points of switches included in the bridgeless rectifier in a direction compensating for the predicted change direction, and wherein the switching time points are changed in a direction in which a phase of the output voltage of the reception-side resonance circuit decreases or increases so that a point of 90° after a positive half-period or a negative half-period of the output voltage starts becomes a center point at which the switches operate.

20. The EV according to claim 19, wherein the bridgeless rectifier includes a first rectifier circuit in which a first diode and a first switch are connected in series and a second rectifier circuit in which a second diode and a second switch are connected in series, and the first rectifier circuit and the second rectifier circuit are connected in parallel with each other.

* * * * *